(12) United States Patent
Kidachi

(10) Patent No.: US 10,362,740 B2
(45) Date of Patent: Jul. 30, 2019

(54) EMITTER AND DRIP IRRIGATION TUBE

(71) Applicant: Enplas Corporation, Saitama (JP)

(72) Inventor: Masahiro Kidachi, Saitama (JP)

(73) Assignee: Enplas Corporation, Saitama (JP)

(*) Notice: Subject to any disclaimer, the term of this patent is extended or adjusted under 35 U.S.C. 154(b) by 7 days.

(21) Appl. No.: 15/552,968

(22) PCT Filed: Feb. 23, 2016

(86) PCT No.: PCT/JP2016/055140
§ 371 (c)(1),
(2) Date: Aug. 23, 2017

(87) PCT Pub. No.: WO2016/136695
PCT Pub. Date: Sep. 1, 2016

(65) Prior Publication Data
US 2018/0027756 A1    Feb. 1, 2018

(30) Foreign Application Priority Data

Feb. 25, 2015  (JP) ................................. 2015-035450
Jun. 2, 2015   (JP) ................................. 2015-112274

(51) Int. Cl.
*A01G 25/02*        (2006.01)

(52) U.S. Cl.
CPC .......... *A01G 25/023* (2013.01); *Y02A 40/237* (2018.01)

(58) Field of Classification Search
CPC ........................ A01G 25/023; Y02A 40/237
USPC ...................................................... 239/542
See application file for complete search history.

(56) References Cited

U.S. PATENT DOCUMENTS

| | | | | | |
|---|---|---|---|---|---|
| 4,059,228 | A | * | 11/1977 | Werner | A01G 25/023 239/106 |
| 4,209,133 | A | * | 6/1980 | Mehoudar | A01G 25/023 239/542 |
| 4,331,293 | A | * | 5/1982 | Rangel-Garza | B05B 1/3447 239/542 |

(Continued)

FOREIGN PATENT DOCUMENTS

| | | |
|---|---|---|
| JP | 2010-046094 A | 3/2010 |
| WO | 2013/175802 A1 | 11/2013 |
| WO | 2014/097638 A1 | 6/2014 |

OTHER PUBLICATIONS

International Search Report from International Application No. PCT/JP2016/055140 dated May 31, 2016.

*Primary Examiner* — Chee-Chong Lee
(74) *Attorney, Agent, or Firm* — Brundidge & Stanger, P.C.

(57) ABSTRACT

In the present invention, the pressure reducing flow path reduces the pressure of an irrigation liquid, and guides the irrigation liquid to the flow-rate decreasing part. The bypass flow path guides the irrigation liquid to the flow path opening/closing part in a state where the pressure of the irrigation liquid is maintained at a pressure higher than that of the irrigation liquid that has passed through the pressure reducing flow path. When the pressure of the irrigation liquid is lower than a first pressure, the irrigation liquid passes through the pressure reducing flow path and the bypass flow path to be guided to the discharge part. When the pressure of the irrigation liquid is a second pressure or higher, the irrigation liquid passes through the pressure reducing flow path to be guided to the discharge part.

10 Claims, 14 Drawing Sheets

(56) References Cited

U.S. PATENT DOCUMENTS

| | | | |
|---|---|---|---|
| 4,623,094 A * | 11/1986 | Smeyers | A01G 25/023 239/109 |
| 6,027,048 A | 2/2000 | Mehoudar | |
| 8,998,112 B2 * | 4/2015 | Cohen | A01G 25/023 239/542 |
| 2012/0199673 A1 | 8/2012 | Cohen | |

* cited by examiner

EMITTER AND DRIP IRRIGATION TUBE

TECHNICAL FIELD

The present invention relates to an emitter and a trickle irrigation tube including the emitter.

BACKGROUND ART

Conventionally, a trickle irrigation method is known as a method for culturing plants. In the trickle irrigation method, a trickle irrigation tube is disposed on the soil where plants are planted, and irrigation liquid such as water and liquid fertilizer is slowly dropped from the trickle irrigation tube to the soil. The trickle irrigation method can minimize the consumption amount of the irrigation liquid, and therefore has been increasingly attracting attention in recent years.

Normally, a trickle irrigation tube includes a tube in which a plurality of through holes for discharging irrigation liquid is formed, and a plurality of emitters (also called "drippers") for discharging the irrigation liquid from the through holes. In addition, regarding the type of emitters, emitters which are joined to the inner wall surface of the tube (see, for example, PTL 1), and emitters which are inserted on the external side of the tube are known.

PTL 1 discloses an emitter that is joined to the inner wall surface of the tube. The emitter disclosed in PTL 1 includes a first member including a water inlet for taking the irrigation liquid, a second member including an outlet for discharging the irrigation liquid, and a film member disposed between the first member and the second member. In the first member, a valve seat part disposed to surround the water inlet, and a pressure reducing groove that serves as a part of pressure reducing channel are formed. In the film member, a through hole is formed at a position corresponding to the downstream end of the pressure reducing groove.

By stacking the first member, the film member and the second member, a pressure reducing channel is formed, and the film member makes contact with the valve seat part to close the water inlet. In addition, a channel through which the irrigation liquid flows from the water inlet to the outlet is formed.

In the emitter disclosed in PTL 1, when the pressure of the irrigation liquid in the tube is equal to or greater than a predetermined pressure, the film member closing the water inlet is pushed by the irrigation liquid, and the irrigation liquid flows into the emitter. The pressure of the irrigation liquid having entered the emitter is reduced by a reducing channel and the irrigation liquid is quantitatively discharged from the outlet.

CITATION LIST

Patent Literature

PTL 1
Japanese Patent Application Laid-Open No. 2010-046094

SUMMARY OF INVENTION

Technical Problem

In a trickle irrigation tube using the emitter disclosed in PTL 1, however, the irrigation liquid does not flow into the emitter until the pressure of the irrigation liquid in the tube is increased to a predetermined pressure or greater, and therefore the trickle irrigation tube does not work when the pressure of the irrigation liquid in the tube is significantly low. In addition, while emitters in the proximity of a feed pump for sending the irrigation liquid to the tube properly work, emitters disposed at a position remote from the feed pump do not properly work. Consequently, depending on the watering position, the flow rate of the supplied irrigation liquid is disadvantageously varied, and the watering distance is disadvantageously limited.

In view of this, an object of the present invention is to provide an emitter and a trickle irrigation tube which can quantitatively discharge irrigation liquid irrespective of whether the pressure of the irrigation liquid is high or low.

Solution to Problem

To solve the above-mentioned problem, the emitter according to embodiments of the present invention is an emitter configured to be joined to an inner wall surface of a tube for distributing irrigation liquid at a position corresponding to a discharging port that communicates between an interior and an exterior of the tube, the emitter being configured to quantitatively discharge the irrigation liquid in the tube out of the tube from the discharging port, the emitter including: a water intake part for intake of the irrigation liquid; a discharging part disposed to face the discharging port and configured to discharge the irrigation liquid; a first channel configured to connect the water intake part and the discharging part together, and distribute the irrigation liquid; a second channel configured to connect the water intake part and the discharging part together, and distribute the irrigation liquid; a flow rate reducing part disposed in the first channel and configured to reduce a flow rate of the irrigation liquid in accordance with a pressure of the irrigation liquid in the tube; a channel opening/closing part disposed in the second channel, and configured to open and close the second channel in accordance with the pressure of the irrigation liquid in the tube; a pressure reducing channel disposed in the first channel on an upstream side relative to the flow rate reducing part, and configured to reduce a pressure of the irrigation liquid taken from the water intake part and guide the irrigation liquid to the flow rate reducing part; and a bypass channel disposed in the second channel on an upstream side relative to the channel opening/closing part, and configured to guide the irrigation liquid taken from the water intake part to the channel opening/closing part while maintaining the pressure of the irrigation liquid taken from the water intake part at a pressure higher than a pressure of the irrigation liquid having passed through the pressure reducing channel. When the pressure of the irrigation liquid flowing through the tube is smaller than a first pressure, the irrigation liquid taken from the water intake part is guided to the discharging part through the pressure reducing channel and the bypass channel, and when the pressure of the irrigation liquid flowing through the tube is equal to or greater than the first pressure, the second channel is closed with the channel opening/closing part, and the irrigation liquid taken from the water intake part is guided to the discharging part through the pressure reducing channel.

To solve the above-mentioned problem, a trickle irrigation tube according to embodiments of the present invention includes: a tube including a discharging port for discharging irrigation liquid; and the above-mentioned emitter joined to an inner wall surface of the tube at a position corresponding to the discharging port.

Advantageous Effects of Invention

The emitter and the trickle irrigation tube according to the embodiments of the present invention can quantitatively discharge irrigation liquid irrespective of whether the pressure of the irrigation liquid is high or low. In addition, the emitter and the trickle irrigation tube according to the embodiments of the present invention can perform quantitative watering of long distance.

DESCRIPTION OF EMBODIMENTS

Embodiments according to the present invention are described in detail below with reference to the accompanying drawings.

Embodiment 1

(Configurations of Trickle Irrigation Tube and Emitter)

Figure 1A:
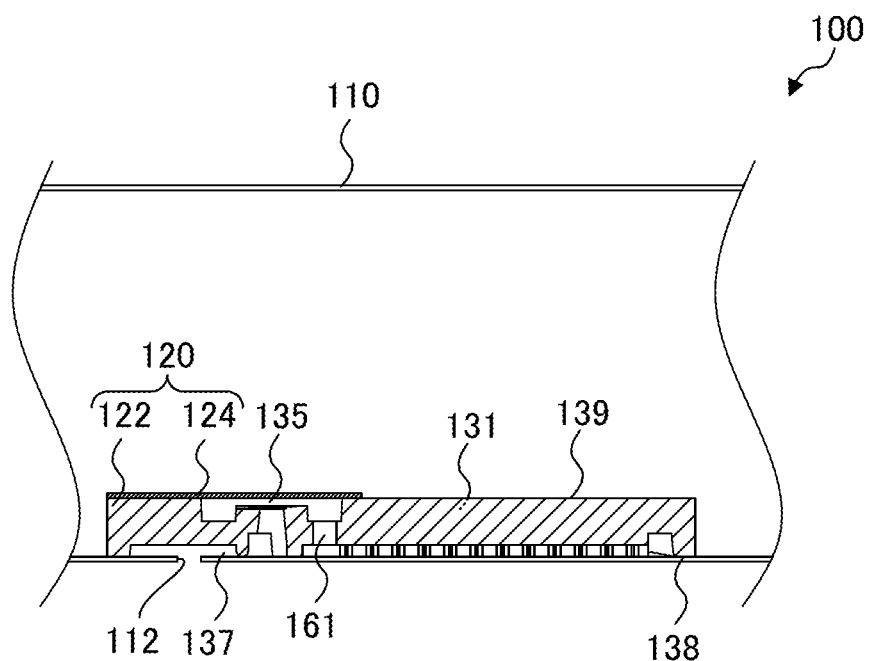
FIGS. 1A and 1B are sectional views of a trickle irrigation tube according to Embodiment 1.
Figure 1B:
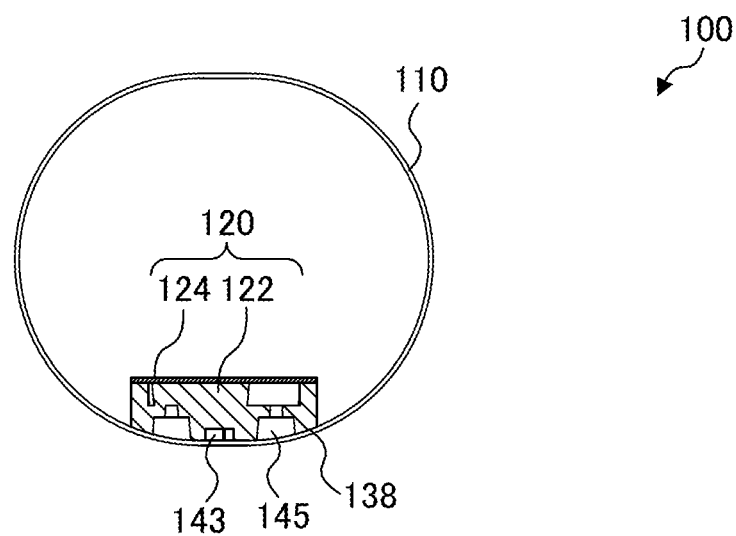

FIG. 1A is an axial sectional view of trickle irrigation tube 100 according to Embodiment 1 of the present invention, and FIG. 1B is a sectional view of trickle irrigation tube 100 in the direction perpendicular to the axis.

As illustrated in FIG. 1, trickle irrigation tube 100 includes tube 110 and emitter 120.

Tube 110 is a tube through which irrigation liquid flows. The material of tube 110 is not limited. In the present embodiment, the material of tube 110 is polyethylene. A plurality of discharging ports 112 for discharging irrigation liquid are formed in the tube wall of tube 110 at a predetermined interval (for example, 200 to 500 mm) in the axis direction of tube 110. The diameter of the opening of discharging port 112 is not limited as long as the irrigation liquid can be discharged. In the present embodiment, the diameter of the opening of discharging port 112 is 1.5 mm. Emitters 120 are joined on the inner wall surface of tube 110 at respective positions corresponding to discharging ports 112. The cross-sectional shape and the cross-sectional area of tube 110 in the direction perpendicular to the axis direction are not limited as long as emitter 120 can be disposed inside tube 110.

Trickle irrigation tube 100 is created by joining rear surface 138 of emitter 120 to the inner wall surface of tube 110. The way of joining tube 110 and emitter 120 is not limited. Tube 110 and emitter 120 are joined to each other by, for example, welding of resin materials of emitter 120 or tube 110, bonding with an adhesive agent and the like. Normally, discharging port 112 is formed after tube 110 and emitter 120 are joined to each other, but discharging port 112 may be formed before the joining.

Figure 2A:
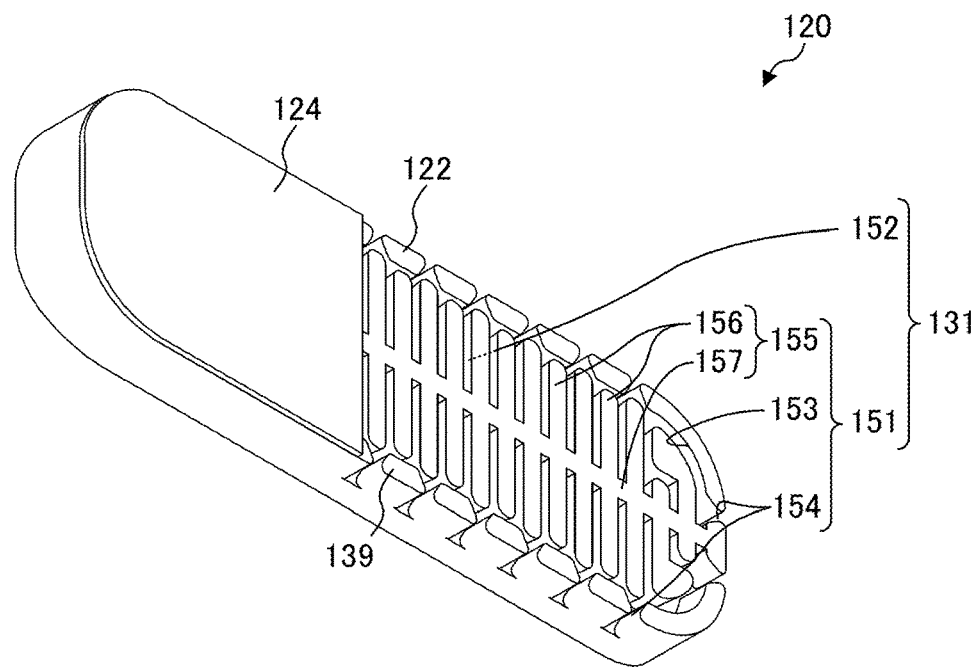
FIGS. 2A and 2B are perspective views of an emitter according to Embodiment 1.
Figure 2B:
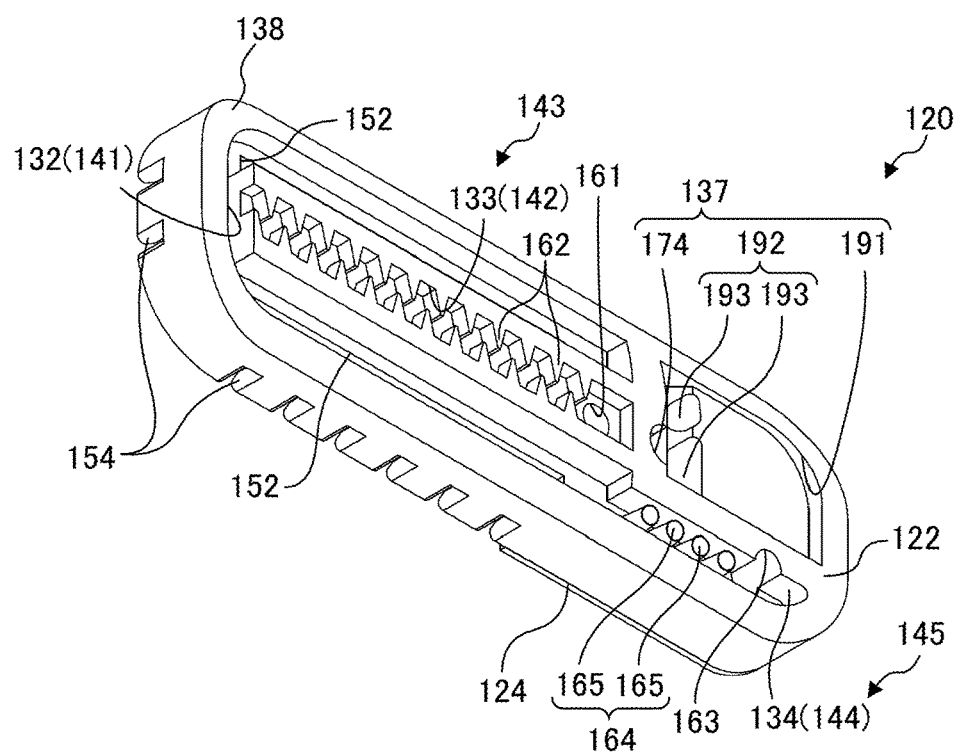
Figure 3A:
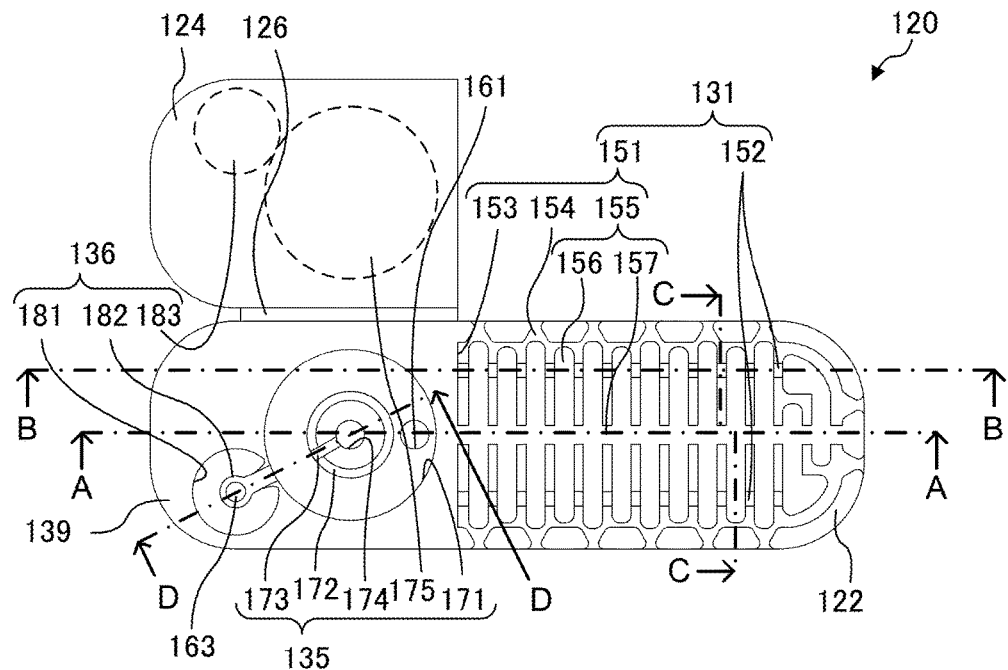
FIGS. 3A and 3B illustrate a configuration of the emitter according to Embodiment 1.
Figure 3B:
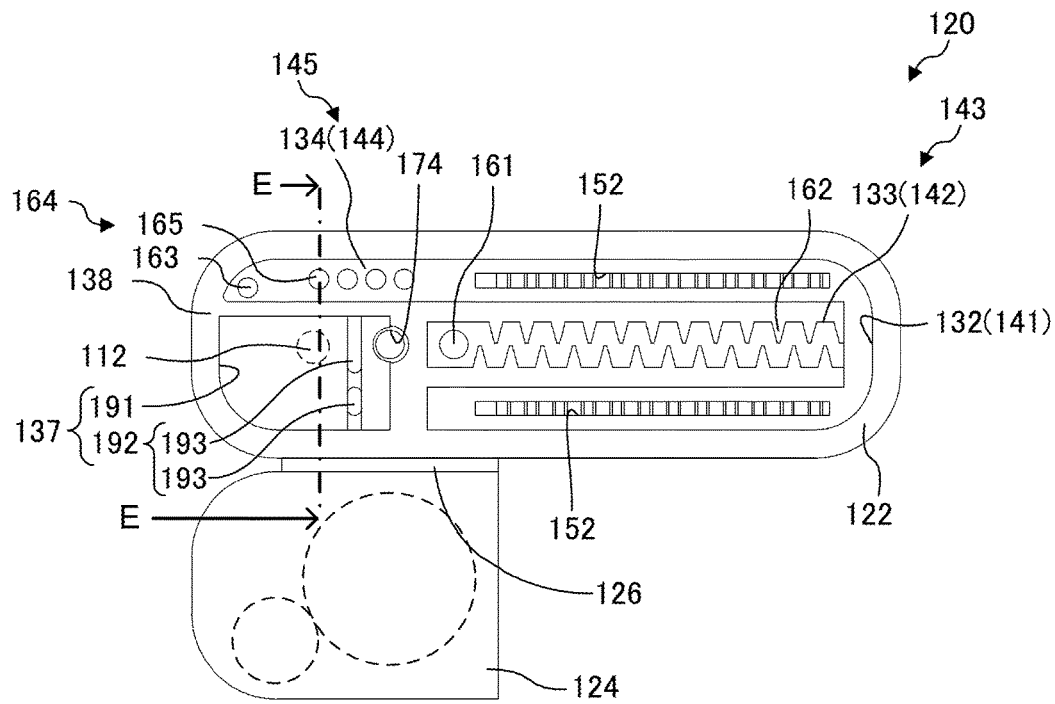
Figure 4A:
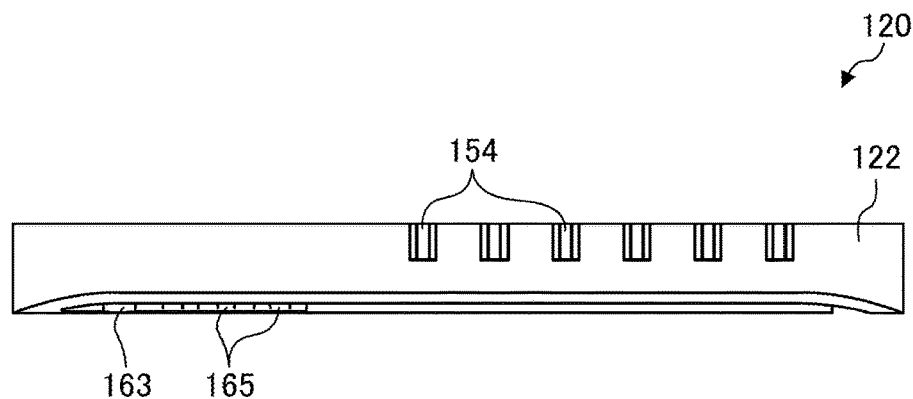
FIGS. 4A to 4C illustrate a configuration of the emitter according to Embodiment 1.
Figure 4B:
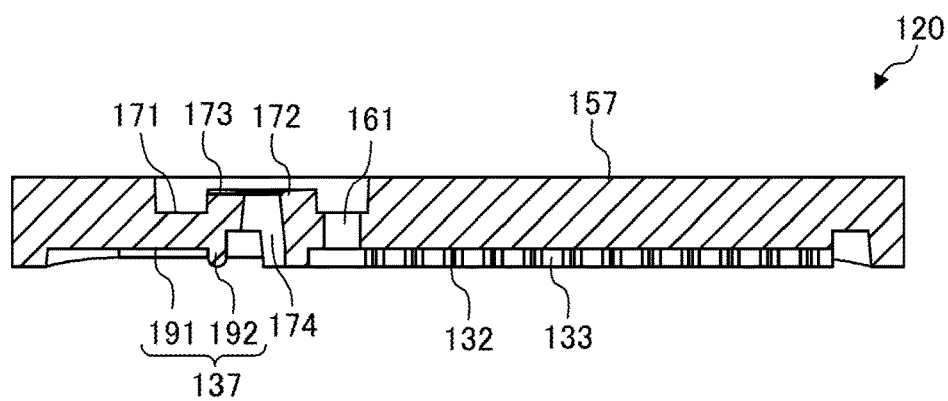
Figure 4C:
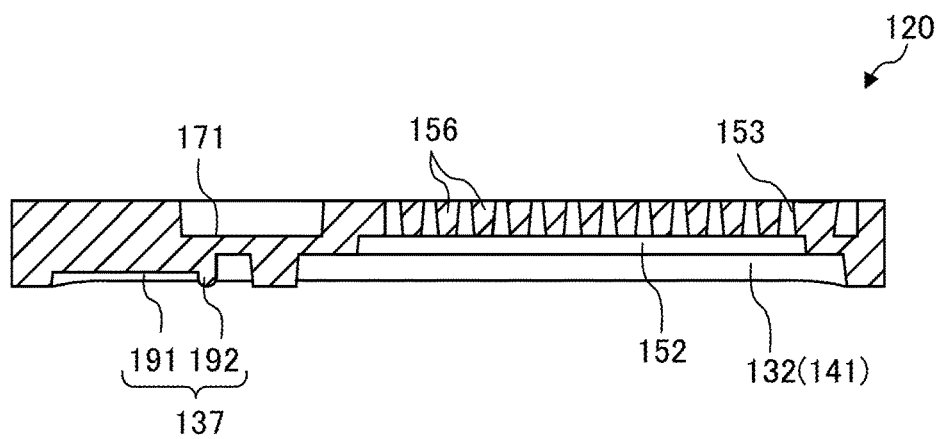
Figure 5A:
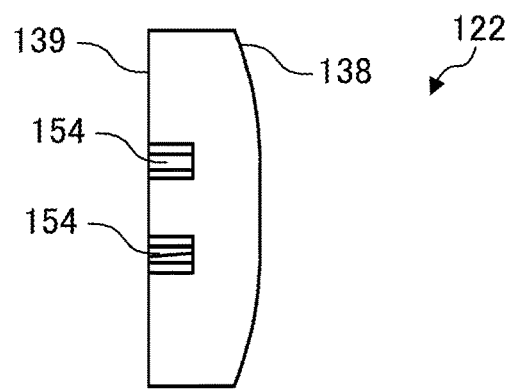
FIGS. 5A to 5C illustrate a configuration of the emitter according to Embodiment 1.
Figure 5B:
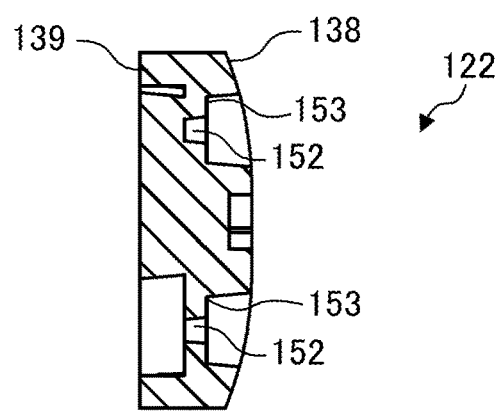
Figure 5C:
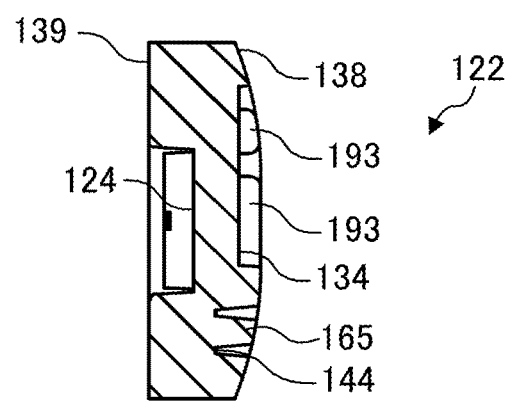

FIG. 2A is a perspective view of emitter 120 as viewed from front surface 139 side, and FIG. 2B is a perspective view of emitter 120 as viewed from rear surface 138 side. FIG. 3A is a plan view of emitter 120 prior to joining of emitter main body 122 and film 124, and FIG. 3B is a bottom view of emitter 120 prior to joining of emitter main body 122 and film 124. FIG. 4A is a side view of emitter 120, FIG. 4B is a sectional view taken along line A-A of FIG. 3A, and FIG. 4C a sectional view taken along line B-B of FIG. 3A. FIG. 5A is a front view of emitter 120, FIG. 5B is a sectional view of emitter main body 122 along line C-C of FIG. 3A, and FIG. 5C is a sectional view of emitter main body 122 along line E-E of FIG. 3B.

As illustrated in FIG. 1A to FIG. 5C, emitter 120 is joined on the inner wall surface of tube 110 to cover discharging port 112. The shape of emitter 120 is not limited as long as emitter 120 can make close contact with the inner wall surface of tube 110 and cover discharging port 112. In the present embodiment, the shape of rear surface 138 that is joined on the inner wall surface of tube 110 in the cross-section of emitter 120 in the direction perpendicular to the axis direction of tube 110 is a nearly arc shape protruding toward the inner wall surface of tube 110 so that the surface is along the inner wall surface of tube 110. The planar shape of emitter 120 is a nearly rectangular shape whose four corners are chamfered. The size of emitter 120 is not limited. In the present embodiment, emitter 120 has a length of 25 mm in the long side direction, a length of 8 mm in the short side direction, and a height of 2.5 mm.

Emitter 120 includes emitter main body 122 that is joined to the inner wall surface of tube 110, and film 124 joined on emitter main body 122. Emitter main body 122 and film 124 are integrally formed through hinge part 126 (see FIGS. 3A and 3B).

Each of emitter main body 122 and film 124 is formed of one material having flexibility. Examples of the material of emitter main body 122 and film 124 include resin and rubber. Examples of the resin include polyethylene and silicone. The flexibility of emitter main body 122 and film 124 can be adjusted with use of elastic resin materials. The flexibility of emitter main body 122 and film 124 can be adjusted by, for example, selecting elastic resins, adjusting the mixing ratio of an elastic resin material to a hard resin material, and the like. An integrally molded product of emitter main body 122 and film 124 can be manufactured by, for example, injection molding.

Emitter 120 includes water intake part 131, connecting groove 132 that serves as connecting channel 141, pressure reducing groove 133 that serves as pressure reducing channel 142, bypass groove 134 that serves as bypass channel 144, flow rate reducing part 135, channel opening/closing part 136, and discharging part 137. Water intake part 131, flow rate reducing part 135 and channel opening/closing part 136 are disposed on front surface 139 side of emitter 120. In addition, connecting groove 132, pressure reducing groove 133, bypass groove 134 and discharging part 137 are disposed on rear surface 138 side of emitter 120.

When emitter 120 and tube 110 are joined to each other, connecting groove 132, pressure reducing groove 133 and bypass groove 134 serve as connecting channel 141, pressure reducing channel 142 and bypass channel 144, respectively. In this manner, first channel 143 composed of water intake part 131, connecting channel 141, pressure reducing channel 142, flow rate reducing part 135 and discharging part 137, and configured to connect water intake part 131 and discharging part 137 together is formed. In addition, second channel 145 composed of water intake part 131, connecting channel 141, bypass channel 144, channel opening/closing part 136 and discharging part 137, and configured to connect water intake part 131 and discharging part 137 together is formed. Each of first channel 143 and second channel 145 distributes the irrigation liquid from water intake part 131 to discharging part 137. In the present embodiment, first channel 143 and second channel 145 overlap each other in the region from water intake part 131 to connecting channel 141. In addition, in the present embodiment, the downstream side of channel opening/closing part 136 of second channel 145 is connected with flow rate reducing part 135, and first channel 143 and second channel 145 overlap each other also in the region from flow rate reducing part 135 to discharging part 137.

Water intake part 131 is disposed in a region not less than half of front surface 139 of emitter 120 (see FIG. 2A and FIG. 3A). Flow rate reducing part 135 and channel opening/closing part 136 (film 124) are disposed in a region on front surface 139 where water intake part 131 is not disposed. Water intake part 131 includes water intake side screen part 151 and a plurality of water intake through holes 152.

Water intake side screen part 151 prevents floating matters in the irrigation liquid which is taken into emitter 120 from intruding into water intake recess 153. Water intake side screen part 151 opens to the interior of tube 110, and includes water intake recess 153, slit 154 and projected line 155.

Water intake recess 153 is one recess formed in the entire region on front surface 139 of emitter 120 where film 124 is not joined. The depth of water intake recess 153 is not limited, and is appropriately set in accordance with the size of emitter 120. A plurality of slits 154 are formed in the outer periphery wall of water intake recess 153, and projected line 155 is formed on the bottom surface of water intake recess 153. In addition, water intake through hole 152 is formed in the bottom surface of water intake recess 153.

Slit 154 connects the internal surface of water intake recess 153, and the external surface of emitter main body 122 together, and prevents floating matters in the irrigation liquid from intruding into water intake recess 153 while taking the irrigation liquid into water intake recess 153 from the side surface of emitter main body 122. The shape of slit 154 is not limited as long as the above-described function can be ensured. In the present embodiment, slit 154 is formed such that the width increases from the external surface of emitter main body 122 toward the internal surface of water intake recess 153 (see FIG. 3A). In this manner, slit 154 is configured in a so-called wedge wire structure, and thus the pressure drop of the water having entered water intake recess 153 is limited.

Projected line 155 is disposed on the bottom surface of water intake recess 153. The position and the number of projected lines 155 are not limited as long as intrusion of floating matters in the irrigation liquid can be prevented while taking the irrigation liquid from the opening side of water intake recess 153. In the present embodiment, projected line 155 includes a plurality of first projected lines 156 extended along the minor axis direction of emitter 120 and arranged in the longitudinal axial direction of emitter 120, and one second projected line 157 disposed along the longitudinal axial direction of emitter 120. First projected line 156 is formed such that the width of first projected line 156 decreases from front surface 139 of emitter main body 122 toward the bottom surface of water intake recess 153 (see FIG. 4C). That is, in the arrangement direction of first projected lines 156, the space between first projected lines 156 adjacent to each other has a so-called wedge wire structure. In addition, the distance between first projected lines 156 adjacent to each other is not limited as long as the above-described function can be ensured. On the other hand, second projected line 157 may be formed such that the width of second projected line 157 decreases from front surface 139 of emitter main body 122 toward the bottom surface of water intake recess 153 as with first projected line 156, or may be formed that first projected line 156 has the same width from front surface 139 of emitter main body 122 to the bottom surface of water intake recess 153. Since the space between first projected lines 156 adjacent to each other is configured in a so-called wedge wire structure as described above, the pressure drop of the water having entered water intake recess 153 is limited.

Water intake through hole 152 is formed in the bottom surface of water intake recess 153. The shape and the number of water intake through hole 152 are not limited as long as the irrigation liquid taken into water intake recess 153 can be taken into emitter main body 122. In the present embodiment, water intake through hole 152 is two long holes formed along the longitudinal axial direction in the bottom surface of water intake recess 153. Since the long holes are covered with first projected lines 156, one water intake through hole 152 appears to be separated into multiple through holes as viewed from the front side.

The irrigation liquid flowing in tube 110 is taken into emitter main body 122 while the floating matters thereof is prevented from intruding into water intake recess 153 by water intake side screen part 151.

Connecting groove 132 (connecting channel 141) connects water intake through hole 152 (water intake part 131), with pressure reducing groove 133 and bypass groove 134. Connecting groove 132 is formed in a nearly U-shape along the external edge on rear surface 138 side of emitter 120. Pressure reducing groove 133 is connected in the vicinity of a center portion of connecting groove 132, and bypass groove 134 is connected at one end of connecting groove 132. When tube 110 and emitter 120 are joined to each other, connecting groove 132 and the inner wall surface of tube 110 form connecting channel 141. The irrigation liquid taken from water intake part 131 flows to pressure reducing channel 142 and bypass channel 144 through connecting channel 141.

Pressure reducing groove 133 (pressure reducing channel 142) is disposed in first channel 143 on the upstream side of flow rate reducing part 135, and connects connecting groove 132 (connecting channel 141) and flow rate reducing part 135. Pressure reducing groove 133 (pressure reducing channel 142) reduces the pressure of the irrigation liquid taken from water intake part 131, and guides the liquid to flow rate reducing part 135. Pressure reducing groove 133 is disposed along the longitudinal axial direction at a center portion of rear surface 138. The upstream end of pressure reducing groove 133 is connected with connecting groove 132, and flow rate reducing through hole 161 communicating with flow rate reducing part 135 is disposed at the downstream end of pressure reducing groove 133. The shape of pressure reducing groove 133 is not limited as long as the above-described function can be ensured. In the present embodiment, pressure reducing groove 133 has a zigzag shape in plan view. In pressure reducing groove 133, protrusions 162 each of which has a nearly triangular prism shape protruding from the internal surface are alternately disposed along the flow direction of the irrigation liquid. In plan view, protrusions 162 are disposed such that the tips of protrusions 162 do not exceed the central axis of pressure reducing groove 133. When tube 110 and emitter 120 are joined to each other, pressure reducing groove 133 and the inner wall surface of tube 110 form pressure reducing channel 142. The pressure of at least a part of the irrigation liquid taken from water intake part 131 is reduced by pressure reducing channel 142 and the part of the irrigation liquid is guided to flow rate reducing part 135. As described in detail later, pressure reducing channel 142 functions mainly when the pressure of the irrigation liquid is high.

Bypass groove 134 (bypass channel 144) is disposed in second channel 145 on the upstream side of channel opening/closing part 136, and connects connecting groove 132 (connecting channel 141) and channel opening/closing part 136. Bypass groove 134 (bypass channel 144) guides the irrigation liquid taken from water intake part 131 to channel opening/closing part 136 while maintaining the pressure of the irrigation liquid taken from water intake part 131 at a pressure higher than the pressure of the irrigation liquid having passed through pressure reducing groove 133 (pressure reducing channel 142). The upstream end of bypass groove 134 is connected with connecting groove 132, and bypass through hole 163 communicating with channel opening/closing part 136 is formed at the downstream end of bypass groove 134. In addition, channel screen part 164 is disposed in bypass groove 134. Channel screen part 164 captures floating matters in the irrigation liquid which have not been collected by water intake side screen part 151. The configuration of channel screen part 164 is not limited as long as the above-described function can be ensured. In the present embodiment, channel screen part 164 is a plurality of columnar protrusions 165 disposed on the bottom surface of bypass groove 134. It is to be noted that channel screen part 164 may not be disposed. When tube 110 and emitter 120 are joined to each other, bypass groove 134 and a part of the inner wall surface of tube 110 form bypass channel 144. A part of the irrigation liquid taken from water intake part 131 is guided to channel opening/closing part 136 through bypass channel 144. As described in detail later, bypass channel 144 functions only when the pressure of the irrigation liquid is low.

Flow rate reducing part 135 is disposed between pressure reducing channel 142 (pressure reducing groove 133) and discharging part 137 in first channel 143, on front surface 139 side of emitter 120. Flow rate reducing part 135 sends the irrigation liquid to discharging part 137 while reducing the flow rate of the irrigation liquid in accordance with the pressure of the irrigation liquid in tube 110. The configuration of flow rate reducing part 135 is not limited as long as the above-described function can be ensured. In the present embodiment, flow rate reducing part 135 includes flow rate reducing recess 171, first valve seat part 172, communication groove 173, discharging through hole 174 communicating with discharging part 137, and first diaphragm part 175 that is a part of film 124. Flow rate reducing through hole 161 communicating with pressure reducing groove 133 (pressure reducing channel 142) and discharging through hole 174 communicating with discharging part 137 open at flow rate reducing recess 171.

Flow rate reducing recess 171 has a nearly circular shape in plan view. Flow rate reducing through hole 161 communicating with pressure reducing groove 133 (pressure reducing channel 142), discharging through hole 174 communicating with discharging part 137, and first valve seat part 172 are disposed on the bottom surface of flow rate reducing recess 171. The depth of flow rate reducing recess 171 is not limited as long as the depth of flow rate reducing recess 171 is greater than the depth of communication groove 173.

Discharging through hole 174 is disposed at a center portion on the bottom surface of flow rate reducing recess 171, and is communicated with discharging part 137. First valve seat part 172 is disposed to surround discharging through hole 174 on the bottom surface of flow rate reducing recess 171. First valve seat part 172 is formed such that first diaphragm part 175 can make close contact therewith when the pressure of the irrigation liquid flowing through tube 110 is equal to or greater than a second pressure. First valve seat part 172 and first diaphragm part 175 make contact with each other to reduce the flow rate of the irrigation liquid which flows into discharging part 137 from flow rate reducing recess 171. The shape of first valve seat part 172 is not limited as long as the above-described function can be ensured. In the present embodiment, first valve seat part 172 has a shape of an annular protrusion. Communication groove 173 that communicates between the interior of flow rate reducing recess 171 and discharging through hole 174 is formed in a part of the region of first valve seat part 172 where first diaphragm part 175 can make close contact therewith. Flow rate reducing through hole 161 communicating with pressure reducing groove 133 is formed in a region where first valve seat part 172 is not disposed on the bottom surface of flow rate reducing recess 171. It is to be noted that flow rate reducing through hole 161 communicating with pressure reducing groove 133 (pressure reducing channel 142) may be disposed to be surrounded with first valve seat part 172, and discharging through hole 174 communicating with discharging part 137 may be disposed outside first valve seat part 172.

First diaphragm part 175 is a part of film 124. First diaphragm part 175 is disposed as a partition between the interior of flow rate reducing recess 171 and the interior of tube 110. First diaphragm part 175 deforms such that it makes contact with first valve seat part 172 in accordance with the pressure of the irrigation liquid in tube 110. To be more specific, first diaphragm part 175 deforms toward first valve seat part 172 as the pressure of the irrigation liquid increases, and finally first diaphragm part 175 makes contact with first valve seat part 172. Even in the case where first diaphragm part 175 is in close contact with first valve seat part 172, first diaphragm part 175 does not close flow rate reducing through hole 161, discharging through hole 174 or communication groove 173, and therefore the irrigation liquid sent from flow rate reducing through hole 161 is sent to discharging part 137 through communication groove 173 and discharging through hole 174. It is to be noted that first diaphragm part 175 is disposed next to second diaphragm part 183 described later.

Channel opening/closing part 136 is disposed between bypass channel 144 (bypass groove 134) and discharging part 137 in second channel 145, on front surface 139 side of emitter 120. Channel opening/closing part 136 opens second channel 145 in accordance with the pressure in tube 110 to send the irrigation liquid to discharging part 137. In the present embodiment, the downstream side of channel opening/closing part 136 is connected with flow rate reducing part 135, and the irrigation liquid from bypass channel 144 (bypass groove 134) reaches discharging part 137 through channel opening/closing part 136 and flow rate reducing part 135. The configuration of channel opening/closing part 136 is not limited as long as the above-described function can be ensured. In the present embodiment, channel opening/closing part 136 includes channel opening/closing recess 181, second valve seat part 182, and second diaphragm part 183 that is a part of film 124. Bypass through hole 163 communicating with bypass groove 134 (bypass channel 144) opens at channel opening/closing recess 181. In addition, channel opening/closing recess 181 is communicated with flow rate reducing recess 171 of flow rate reducing part 135.

Channel opening/closing recess 181 has a nearly circular shape in plan view. Bypass through hole 163 connected with bypass groove 134 and second valve seat part 182 are disposed on the bottom surface of channel opening/closing recess 181. The internal surface of channel opening/closing recess 181 is tilted from the center portion toward the external edge from rear surface 138 toward front surface 139. The bottom surface of channel opening/closing recess 181 is disposed on front surface 139 side relative to the bottom surface of flow rate reducing recess 171. That is, the depth of channel opening/closing recess 181 is smaller than that of flow rate reducing recess 171. With this configuration, when deformed by the pressure of the irrigation liquid, film 124 makes contact with second valve seat part 182 before making contact with first valve seat part 172.

Bypass through hole 163 communicating with bypass groove 134 is disposed at a center portion of the bottom surface of channel opening/closing recess 181. Second valve seat part 182 is disposed on the bottom surface of channel opening/closing recess 181 to surround bypass through hole 163. In addition, second valve seat part 182 is disposed to face second diaphragm part 183 without making contact with second diaphragm part 183 such that second diaphragm part 183 can make close contact therewith when the pressure of the irrigation liquid flowing through tube 110 is equal to or greater than a first pressure. When the pressure of the irrigation liquid flowing through tube 110 is equal to or greater than the first pressure, second diaphragm part 183 makes close contact with second valve seat part 182 to close bypass through hole 163, and thus closes second channel 145. The shape of second valve seat part 182 is not limited as long as the above-described function can be ensured. In the present embodiment, second valve seat part 182 is a part of the bottom surface of channel opening/closing recess 181 surrounding bypass through hole 163. It is to be noted that second valve seat part 182 may be an annular protrusion disposed to surround bypass through hole 163 as with first valve seat part 172.

Second diaphragm part 183 is a part of film 124, and is disposed next to first diaphragm part 175. Second diaphragm part 183 is disposed as a partition between the interior of channel opening/closing recess 181 and the interior of tube 110. Second diaphragm part 183 deforms to make contact with second valve seat part 182 in accordance with the pressure of the irrigation liquid in tube 110. To be more specific, second diaphragm part 183 deforms toward second valve seat part 182 as the pressure of the irrigation liquid increases, and, when the pressure of the irrigation liquid reaches the first pressure, makes contact with second valve seat part 182. In this manner, second channel 145 (bypass through hole 163) is closed.

Discharging part 137 is disposed on rear surface 138 side of emitter 120. Discharging part 137 sends the irrigation liquid from discharging through hole 174 to discharging port 112 of tube 110. The configuration of discharging part 137 is not limited as long as the above-described function can be ensured. In the present embodiment, discharging part 137 includes discharging recess 191 and intrusion preventing part 192.

Discharging recess 191 is disposed on rear surface 138 side of emitter 120. Discharging recess 191 has a nearly rectangular shape in plan view. Discharging through hole 174 and intrusion preventing part 192 are disposed on the bottom surface of discharging recess 191.

Intrusion preventing part 192 prevents intrusion of foreign matters from discharging port 112. Intrusion preventing part 192 is not limited as long as the above-described function can be ensured. In the present embodiment, intrusion preventing part 192 includes a plurality of projected line parts 193 adjacent to each other. Projected line parts 193 are disposed such that projected line parts 193 are located between discharging through hole 174 and discharging port 112 when emitter 120 is joined to tube 110.

Film 124 includes first diaphragm part 175 and second diaphragm part 183. Film 124 has a thickness of 0.3 mm, for example.

Hinge part 126 is connected with a part of front surface 139 of emitter main body 122. In the present embodiment, hinge part 126 has a thickness equal to that of film 124, and is shaped integrally with emitter main body 122 and film 124. It is to be noted that film 124 may be prepared as a member separated from emitter main body 122, and may be joined to emitter main body 122.

Emitter 120 is configured by turning film 124 about hinge part 126 and by joining film 124 to front surface 139 of emitter main body 122. The way of joining film 124 to emitter main body 122 is not limited. Emitter main body 122 and film 124 may be joined to each other by, for example, welding of resin materials of film 124, bonding with an adhesive agent and the like. It is to be noted that hinge part 126 may be cut after emitter main body 122 and film 124 are joined to each other.

(Operations of Trickle Irrigation Tube and Emitter)

Next, an operation of trickle irrigation tube 100 is described. First, irrigation liquid is fed into tube 110. Examples of the irrigation liquid include water, liquid fertilizer, agricultural chemicals and mixtures thereof. The pressure of the irrigation liquid which is fed to trickle irrigation tube 100 is preferably 0.1 MPa or lower in view of readily applying a trickle irrigation method, and preventing tube 110 and emitter 120 from being damaged. The irrigation liquid in tube 110 is taken into emitter 120 from water intake part 131. To be more specific, the irrigation liquid in tube 110 enters water intake recess 153 from slit 154, or the gaps between first projected lines 156, and passes through water intake through hole 152. At this time, since water intake part 131 includes water intake side screen part 151 (slit 154 and the gaps between first projected lines 156), floating matters in the irrigation liquid can be removed. In addition, since a so-called wedge wire structure is formed in water intake part 131, the pressure drop of the water at the time of taking the water into water intake part 131 is limited.

The irrigation liquid taken from water intake part 131 reaches connecting channel 141. The irrigation liquid having reached connecting channel 141 flows into pressure reducing channel 142 and bypass channel 144. At this time, the irrigation liquid first advances through bypass channel 144 in which pressure drop is small in comparison with pressure reducing channel 142. The irrigation liquid having entered bypass channel 144 flows into channel opening/closing part 136 through bypass through hole 163.

The irrigation liquid having entered channel opening/closing part 136 flows into discharging part 137 through flow rate reducing part 135. The irrigation liquid having entered discharging part 137 is discharged out of tube 110 from discharging port 112 of tube 110.

On the other hand, the irrigation liquid having entered pressure reducing channel 142 reaches flow rate reducing part 135 through flow rate reducing through hole 161. The irrigation liquid having entered flow rate reducing part 135 flows into discharging part 137. The irrigation liquid having entered discharging part 137 is discharged out of tube 110 from discharging port 112 of tube 110.

As described above, flow rate reducing part 135 and channel opening/closing part 136 are communicated with each other. In addition, flow rate reducing part 135 controls the flow rate of the irrigation liquid in accordance with the pressure of the irrigation liquid in tube 110 by first diaphragm part 175, and channel opening/closing part 136 controls the flow rate of the irrigation liquid in accordance with the pressure of the irrigation liquid in tube 110 by second diaphragm part 183. In view of this, operations of channel opening/closing part 136 and flow rate reducing part 135 in accordance with the pressure of the irrigation liquid in tube 110 are described below.

Figure 6A:
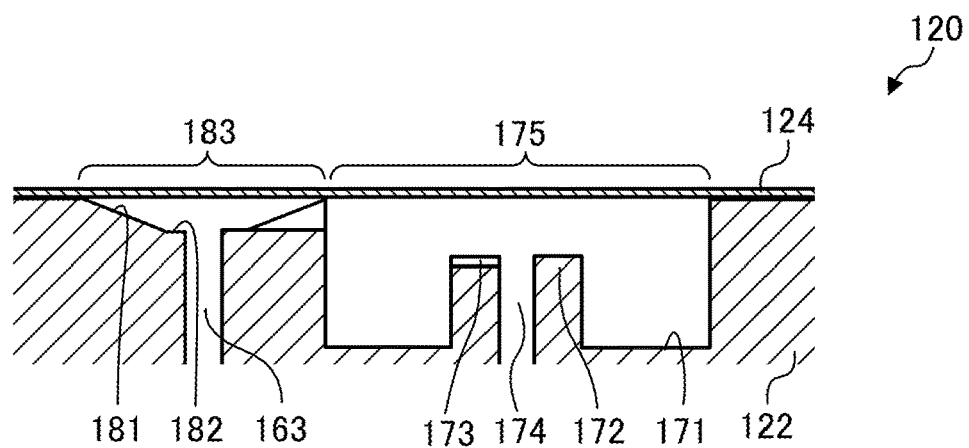
FIGS. 6A to 6C are schematic views for describing an operation of the emitter according to Embodiment 1.
Figure 6B:
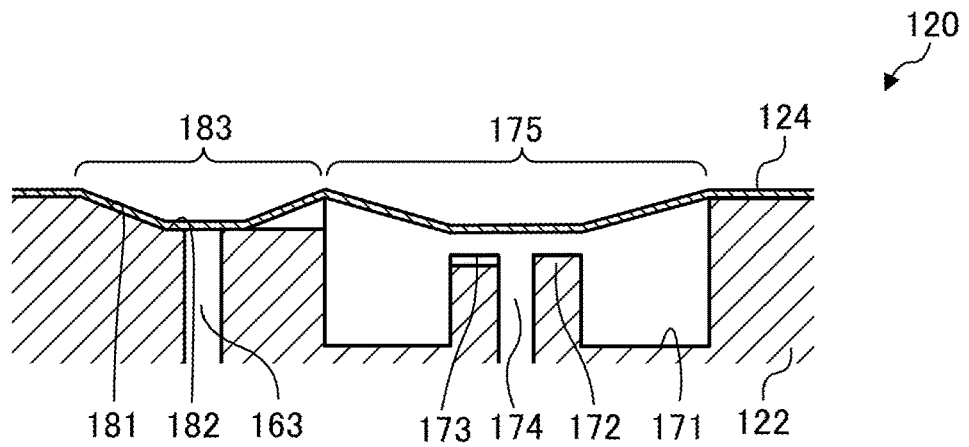
Figure 6C:
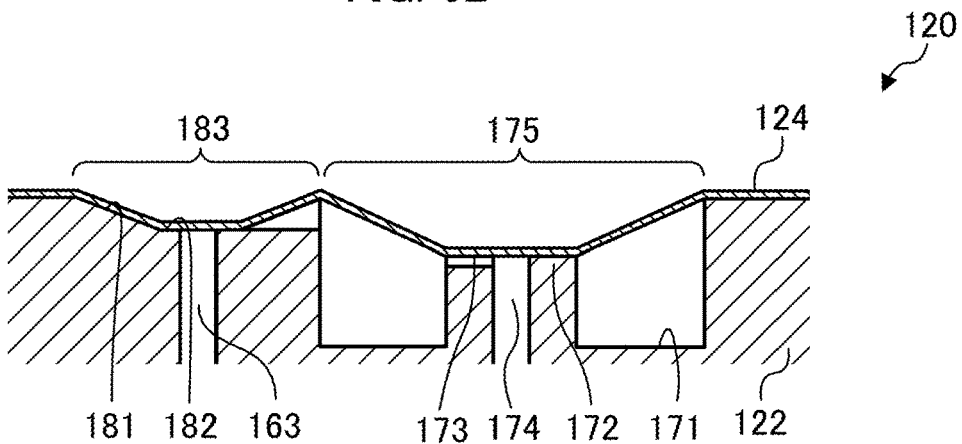
Figure 7:
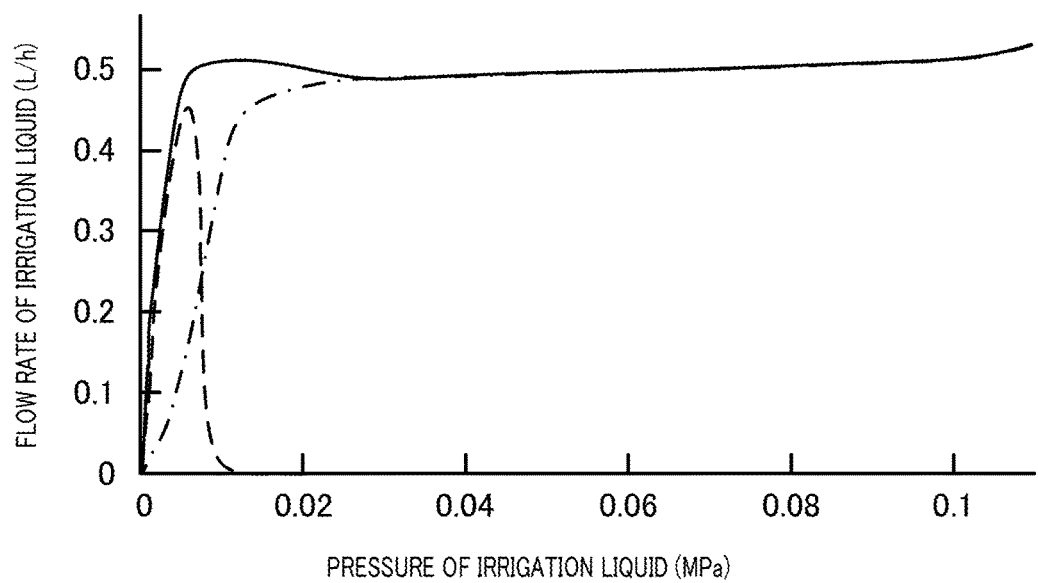
FIG. 7 is a graph illustrating an exemplary relationship between the pressure of the irrigation liquid in a tube, and the flow rate of the irrigation liquid dropped from a discharging port in the case where the trickle irrigation tube according to Embodiment 1 is used.

FIGS. 6A to 6C are schematic views illustrating a relationship between operations of flow rate reducing part 135 and channel opening/closing part 136. It is to be noted that FIGS. 6A to 6C schematically illustrate cross-sections along line D-D of FIG. 3A to describe the operation of emitter 120. FIG. 6A is a sectional view of tube 110 provided with no irrigation liquid, FIG. 6B is a sectional view of the case where the pressure of the irrigation liquid in tube 110 is the first pressure, and FIG. 6C is a sectional view of the case where the pressure of the irrigation liquid in tube 110 is the second pressure greater than the first pressure. FIG. 7 is a graph illustrating an exemplary relationship between the pressure of the irrigation liquid in tube 110 and the flow rate of the irrigation liquid dropped from discharging port 112. In FIG. 7, the solid line indicates the total flow rate of the irrigation liquid which is dropped from discharging port 112, the broken line indicates the flow rate of the irrigation liquid having passed through second channel 145 (through bypass channel 144), and the dashed line indicates the flow rate of the irrigation liquid having passed through first channel 143 (through pressure reducing channel 142). In FIG. 7, the abscissa indicates the pressure (MPa) of the irrigation liquid, and the ordinate indicates the flow rate (L/h) of the irrigation liquid discharged from discharging port 112.

Before irrigation liquid is fed into tube 110, the pressure of irrigation liquid is not exerted on film 124, and therefore first diaphragm part 175 and second diaphragm part 183 are not deformed (see FIG. 6A).

When feeding of irrigation liquid into tube 110 is started, first diaphragm part 175 of flow rate reducing part 135 starts to deform toward first valve seat part 172. In addition, second diaphragm part 183 of channel opening/closing part 136 starts to deform toward second valve seat part 182. At this time, however, first diaphragm part 175 is not in contact with first valve seat part 172, and second diaphragm part 183 is not in contact with second valve seat part 182, and therefore, the irrigation liquid taken from water intake part 131 is discharged from discharging port 112 of tube 110 through first channel 143 (connecting channel 141, pressure reducing channel 142, flow rate reducing part 135 and discharging part 137) and second channel 145 (connecting channel 141, bypass channel 144, channel opening/closing part 136, flow rate reducing part 135 and discharging part 137). In this manner, at the start of feeding of irrigation liquid into tube 110, at the time when the pressure of the irrigation liquid in tube 110 is low, and the like, the irrigation liquid taken from water intake part 131 is discharged through reducing channel 142 and bypass channel 144.

When the pressure of the irrigation liquid in tube 110 reaches the first pressure, second diaphragm part 183 makes contact with second valve seat part 182 to close second channel 145 (see FIG. 6B). At this time, first diaphragm part 175 is not in contact with first valve seat part 172. Accordingly, when the pressure of the irrigation liquid in tube 110 is high enough to deform film 124, second diaphragm part 183 is brought close to second valve seat part 182, and the amount of the irrigation liquid which is discharged through second channel 145 is reduced. When the pressure of the irrigation liquid in tube 110 reaches the first pressure, the irrigation liquid in second channel 145 is discharged from discharging port 112 (see the broken line of FIG. 7). As a result, the irrigation liquid taken from water intake part 131 is not discharged from discharging port 112 of tube 110 through first channel 143.

When the pressure of the irrigation liquid in tube 110 is further increased, first diaphragm part 175 is further deformed toward first valve seat part 172. Normally, the amount of the irrigation liquid flowing through first channel 143 increases as the pressure of the irrigation liquid increases. In contrast, in emitter 120 according to the present embodiment, the pressure of the irrigation liquid is reduced by pressure reducing channel 142, and the distance between first diaphragm part 175 and first valve seat part 172 is small to thereby prevent the amount of the irrigation liquid flowing through first channel 143 from being excessively increased. When the pressure of the irrigation liquid in tube 110 is the second pressure greater than the first pressure, first diaphragm part 175 makes contact with first valve seat part 172 (see FIG. 6C). Even in this case, first diaphragm part 175 does not close flow rate reducing through hole 161, communication groove 173 or discharging through hole 174, and accordingly the irrigation liquid taken from water intake part 131 is discharged from discharging port 112 of tube 110 through communication groove 173. In this manner, when the pressure of the irrigation liquid in tube 110 is equal to or greater than the second pressure, flow rate reducing part 135 limits the increase of the amount of the irrigation liquid flowing through first channel 143 with second diaphragm part 183 making contact with second valve seat part 182 (see the dashed line of FIG. 7).

In this manner, flow rate reducing part 135 and channel opening/closing part 136 function to complement the amount of the liquid flowing therethrough in accordance with the pressure of the irrigation liquid in tube 110, and thus trickle irrigation tube 100 according to the present embodiment can discharge a constant amount of irrigation liquid out of tube 110 irrespective of whether the pressure of the irrigation liquid is low or high (see the solid line of FIG. 7).

(Effect)

As described above, trickle irrigation tube 100 according to the present embodiment includes channel opening/closing part 136 that operates mainly in a low pressure state, and flow rate reducing part 135 that operates mainly in a high pressure state, and thus can quantitatively drop the irrigation liquid irrespective of the pressure of the irrigation liquid in tube 110.

(Modification)

Figure 8A:
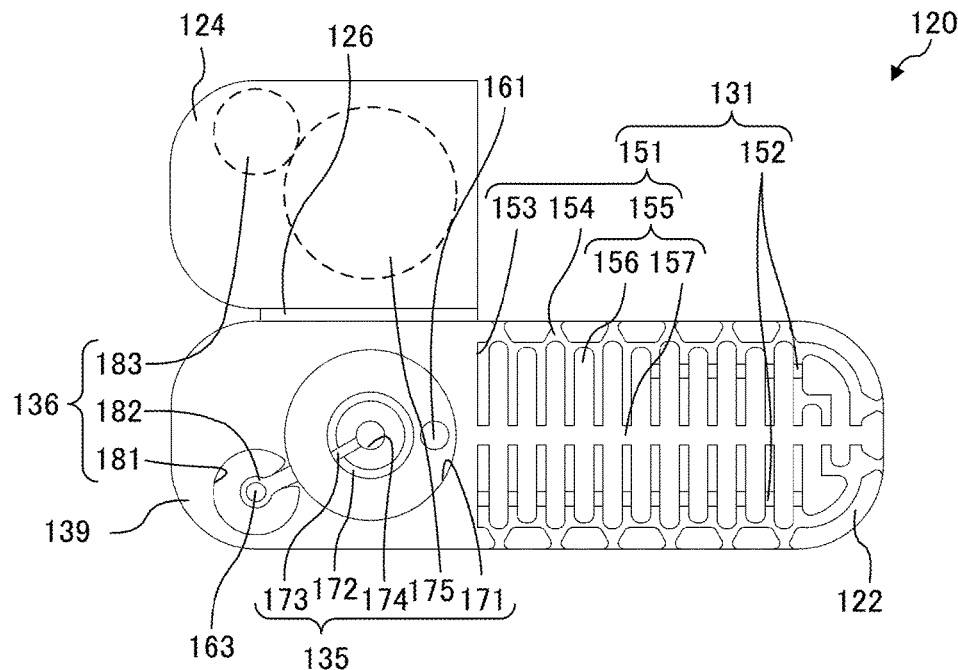
FIGS. 8A and 8B illustrate a configuration of an emitter according to a modification of Embodiment 1.
Figure 8B:
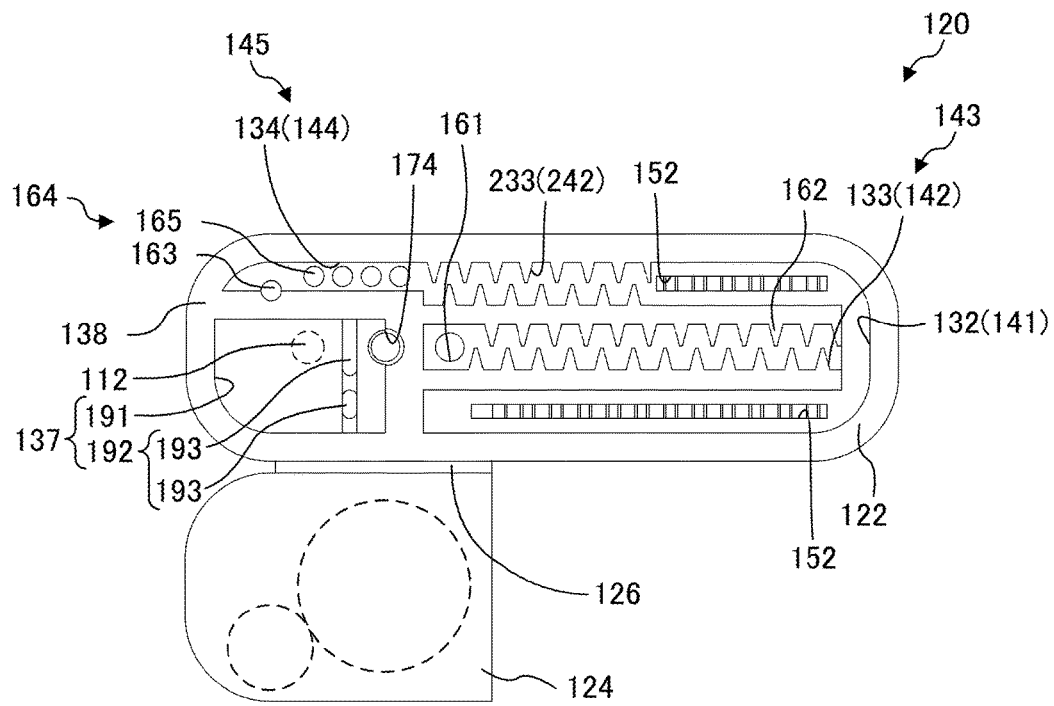

It is to be noted that, as illustrated in FIG. 8A and FIG. 8B, second pressure reducing groove 233 may be provided between connecting groove 132 and bypass groove 134 as necessary. In this case, corresponding water intake through hole 152 is shortened. Except for the reduced channel length, the configuration of second pressure reducing groove 233 is identical to that of pressure reducing groove 133. When joined to tube 110, second pressure reducing groove 233 serves as second pressure reducing channel 242. In this case, the flow rate of the irrigation liquid flowing through second channel 145 can also be adjusted.

Embodiment 2

The trickle irrigation tube according to Embodiment 2 is different from trickle irrigation tube 100 according to Embodiment 1 in configuration of emitter 320. In view of this, the configurations similar to those of Embodiment 1 are denoted with the same reference numerals, and the description thereof will be omitted.

Figure 9A:
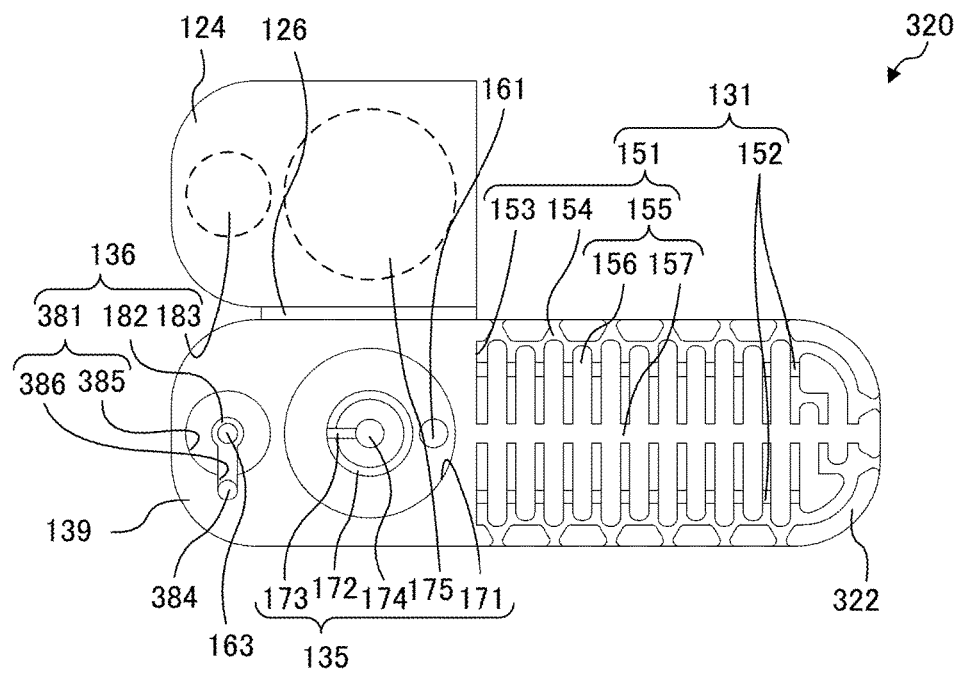
FIGS. 9A and 9B illustrate a configuration of an emitter according to Embodiment 2.
Figure 9B:
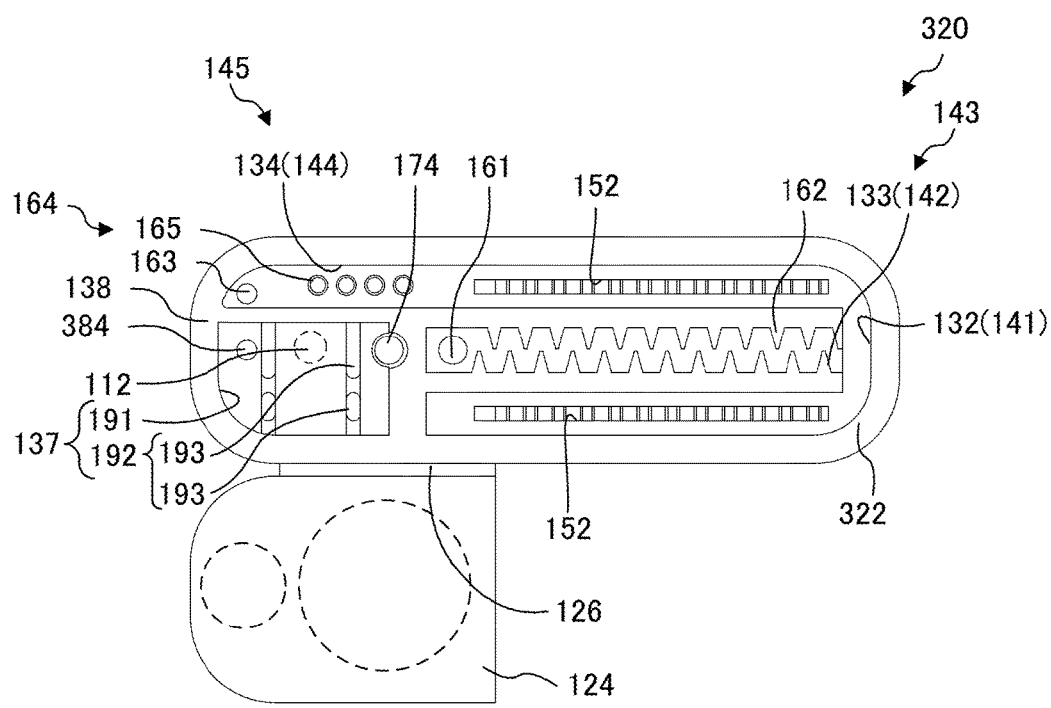

FIG. 9A is a plan view of emitter 320 according to Embodiment 2 prior to joining of emitter main body 322 and film 124, and FIG. 9B is a bottom view of emitter 320 according to Embodiment 2 prior to joining of emitter main body 322 and film 124.

As illustrated in FIG. 9A and FIG. 9B, flow rate reducing part 135 and channel opening/closing part 136 are independently disposed in emitter 320 according to Embodiment 2. Channel opening/closing part 136 includes channel opening/closing recess 381, second valve seat part 182, and second diaphragm part 183 that is a part of film 124.

Channel opening/closing recess 381 includes channel opening/closing recess main body 385 having a circular shape in plan view, and extension part 386 laterally extended from channel opening/closing recess main body 385. Second discharging through hole 384 communicating with discharging part 137 is formed in extension part 386. Second discharging through hole 384 opens at discharging recess 191 in discharging part 137.

In the trickle irrigation tube according to Embodiment 2, flow rate reducing part 135 and channel opening/closing part 136 are independently disposed, and therefore first channel 143 and second channel 145 overlap each other only in the region between water intake part 131 and connecting channel 141, and in discharging part 137.

In the trickle irrigation tube according to Embodiment 2, when the pressure of the irrigation liquid is low, the irrigation liquid is discharged out of tube 110 through second channel 145 and first channel 143. As the pressure of the irrigation liquid increases, the amount of irrigation liquid passing through second channel 145 decreases, while the amount of the irrigation liquid passing through first channel 143 increases. When the pressure of the irrigation liquid reaches the first pressure, second diaphragm part 183 makes contact with second valve seat part 182 to close second channel 145. When second channel 145 is closed, the irrigation liquid is discharged through only first channel 143. When the pressure of the irrigation liquid is further increased to the second pressure or greater, the amount of the irrigation liquid which is discharged through first channel 143 becomes substantially constant. With the above-mentioned configuration, also the trickle irrigation tube according to Embodiment 2 can drop a constant amount of the irrigation liquid irrespective of the pressure of the irrigation liquid.

(Effect)

With the above-mentioned configuration, the trickle irrigation tube according to Embodiment 2 provides an effect similar to that of trickle irrigation tube 100 according to Embodiment 1.

Embodiment 3

A trickle irrigation tube according to Embodiment 3 is different from trickle irrigation tube 100 according to Embodiment 1 in configuration of emitter 420. In view of this, the configurations similar to those of Embodiment 1 are denoted with the same reference numerals, and the description thereof will be omitted.

Figure 10A:
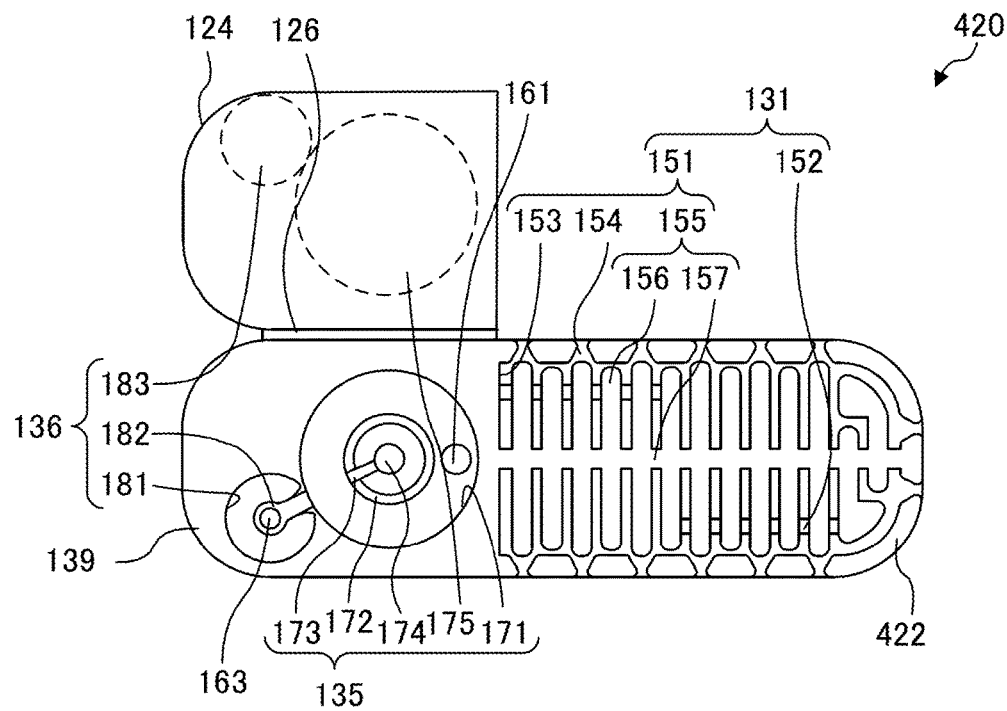
FIGS. 10A and 10B illustrate a configuration of an emitter according to Embodiment 3.
Figure 10B:
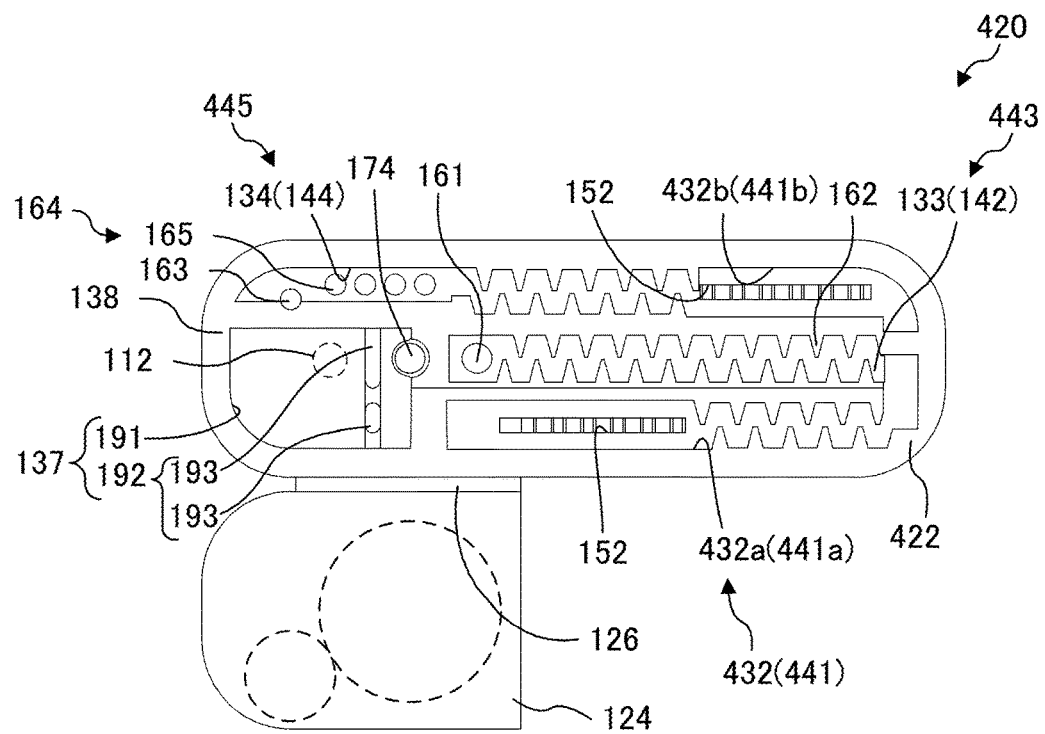

FIG. 10A is a plan view of emitter 420 according to Embodiment 3 prior to joining of emitter main body 422 and film 124, and FIG. 10B is a bottom view of emitter 420 according to Embodiment 3 prior to joining of emitter main body 422 and film 124.

As illustrated in FIG. 10A and FIG. 10B, in emitter 420 according to Embodiment 3, connecting groove 432 (connecting channel 441) includes first connecting groove 432a (first connecting channel 441a) and second connecting groove 432b (second connecting channel 441b). First connecting groove 432a connects one of water intake through holes 152 and pressure reducing groove 133. A part of the region of first connecting groove 432a is formed to function as a pressure reducing groove (pressure reducing channel). In addition, second connecting groove 432b connects the other of water intake through holes 152 and bypass groove 134. A part of the region of second connecting groove 432b is formed to function as a pressure reducing groove (pressure reducing channel).

In the trickle irrigation tube according to Embodiment 3, connecting groove 432 (connecting channel 441) includes first connecting groove 432a (first connecting channel 441a) and second connecting groove 432b (second connecting channel 441b), and accordingly first channel 443 and second channel 445 overlap each other only in discharging part 137. That is, first channel 443 composed of water intake part 131, connecting channel 441 (first connecting channel 441a), pressure reducing channel 142, flow rate reducing part 135 and discharging part 137, and configured to connect water intake part 131 and discharging part 137 is formed. In addition, second channel 445 composed of water intake part 131, connecting channel 441 (second connecting channel 441b), bypass channel 144, channel opening/closing part 136, flow rate reducing part 135 and discharging part 137, and configured to connect water intake part 131 and discharging part 137 is formed. Each of first channel 443 and second channel 445 distributes the irrigation liquid from water intake part 131 to discharging part 137. In the present embodiment, the downstream side of channel opening/closing part 136 of second channel 445 is connected with flow rate reducing part 135, and first channel 443 and second channel 445 overlap each other in the region from flow rate reducing part 135 to discharging part 137.

In the trickle irrigation tube according to Embodiment 3, when the pressure of the irrigation liquid is low, the irrigation liquid is discharged out of tube 110 through second channel 445 and first channel 443. As the pressure of the irrigation liquid increases, the amount of the irrigation liquid passing through second channel 445 decreases, while the amount of the irrigation liquid passing through first channel 443 increases. When the pressure of the irrigation liquid reaches the first pressure, second diaphragm part 183 makes contact with second valve seat part 182 to close second channel 445. When second channel 445 is closed, the irrigation liquid is discharged through only first channel 443. When the pressure of the irrigation liquid is further increased to the second pressure or greater, the amount of the irrigation liquid which is discharged through first channel 443 becomes substantially constant. With the above-mentioned configuration, the trickle irrigation tube according to Embodiment 3 also can drop a constant amount of the irrigation liquid irrespective of the pressure of the irrigation liquid.

(Effect)

With the above-mentioned configuration, the trickle irrigation tube according to Embodiment 3 provides an effect similar to that of trickle irrigation tube 100 according to Embodiment 1.

Embodiment 4

A trickle irrigation tube according to Embodiment 4 is different from trickle irrigation tube 100 according to Embodiment 1 in configuration of emitter 520. In view of this, the configurations similar to those of Embodiment 1 are denoted with the same reference numerals, and the description thereof will be omitted.

Figure 11A:
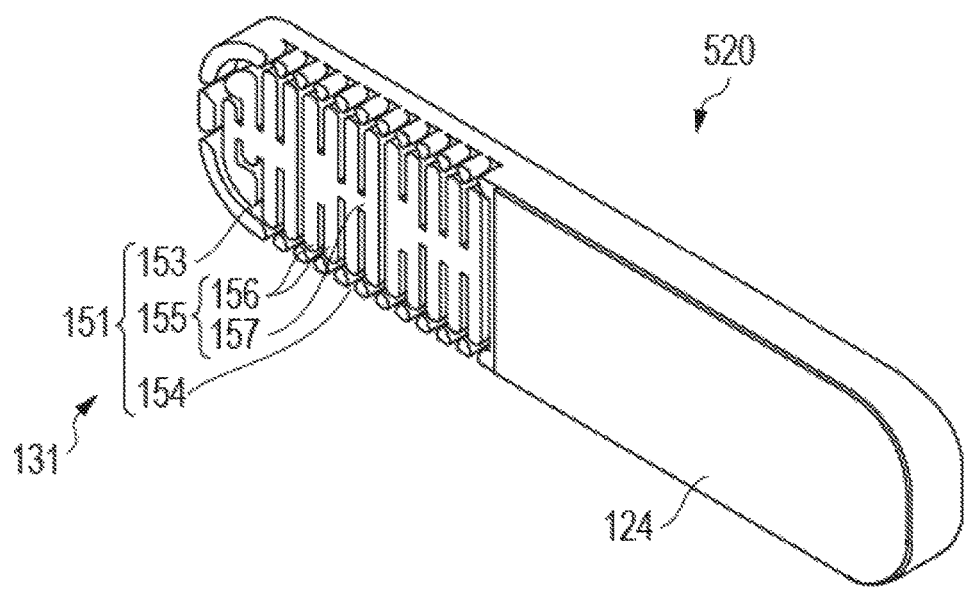
FIGS. 11A and 11B are perspective views of an emitter according to Embodiment 4.
Figure 11B:
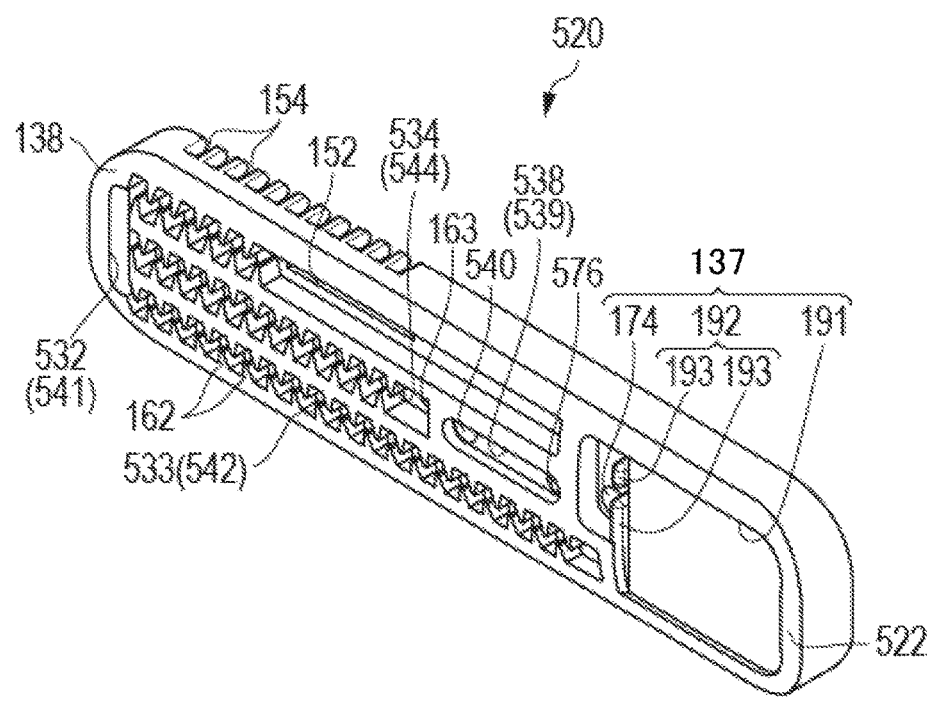
Figure 12A:
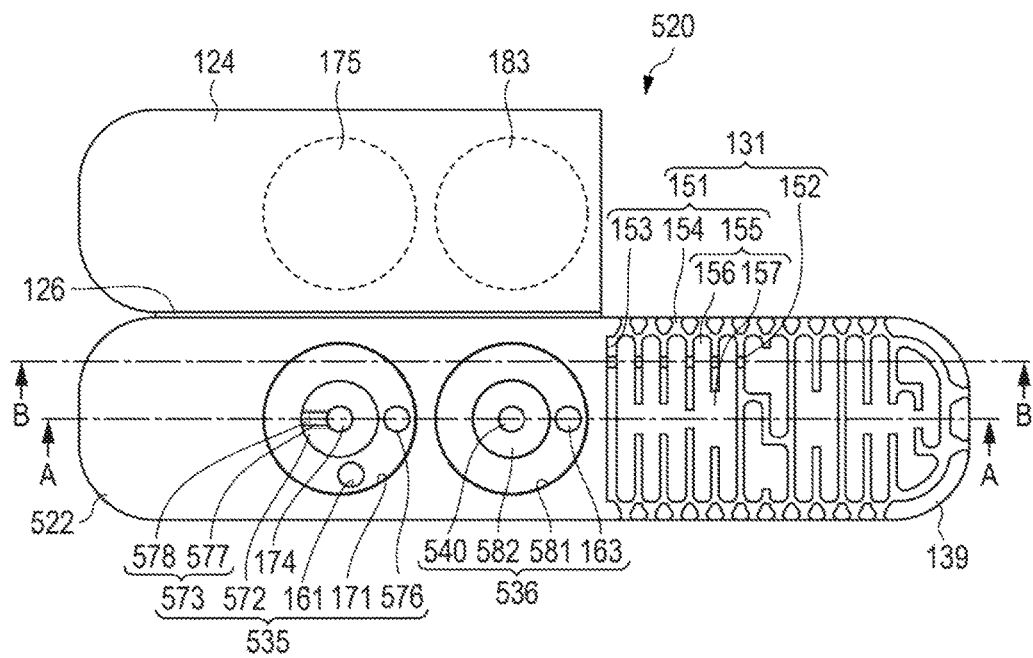
FIGS. 12A and 12B illustrate a configuration of the emitter according to Embodiment 4.
Figure 12B:
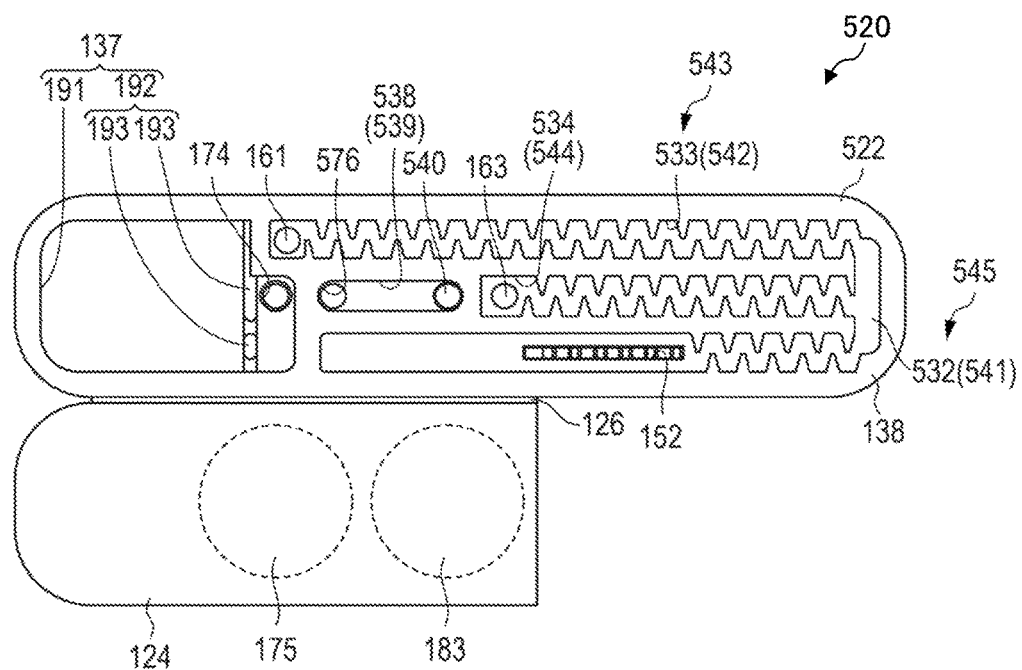
Figure 13A:
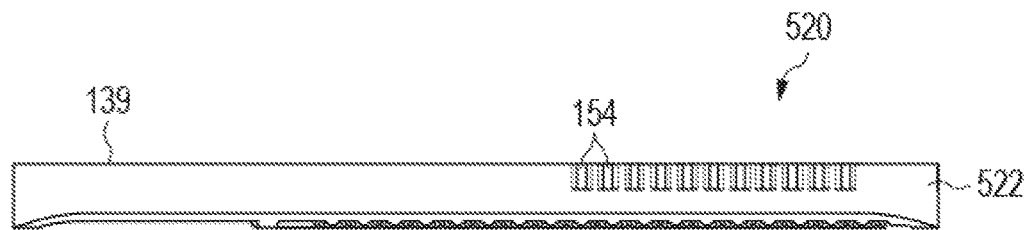
FIGS. 13A to 13C illustrate a configuration of the emitter according to Embodiment 4.
Figure 13B:
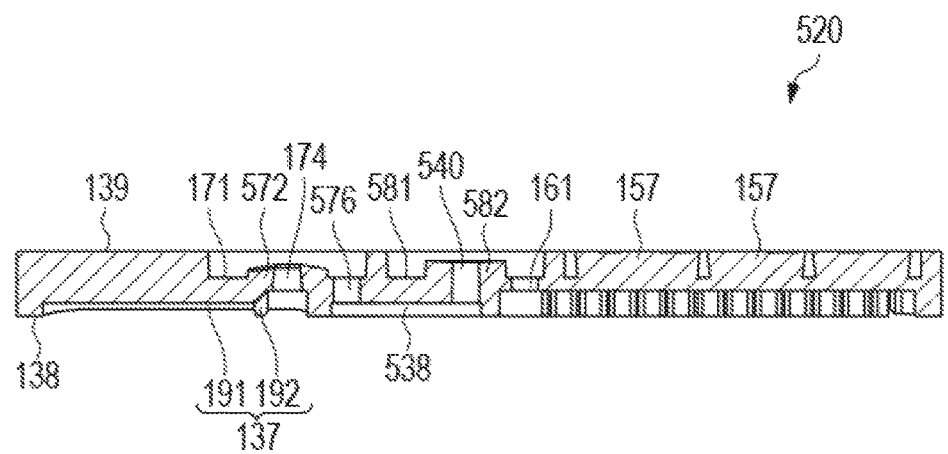
Figure 13C:
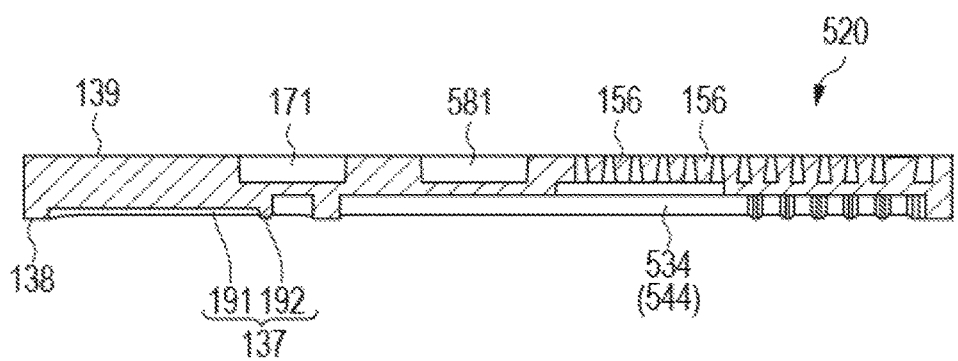
Figure 14A:
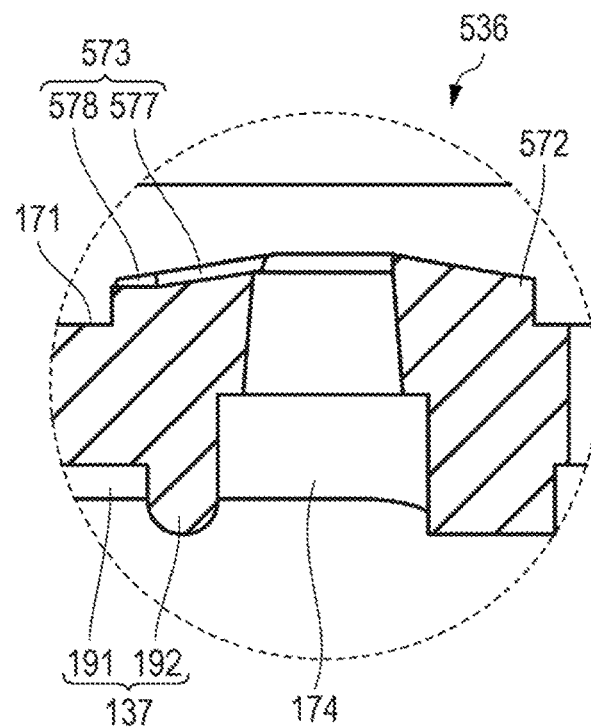
FIGS. 14A and 14B are partially enlarged sectional views of the emitter according to Embodiment 4.
Figure 14B:
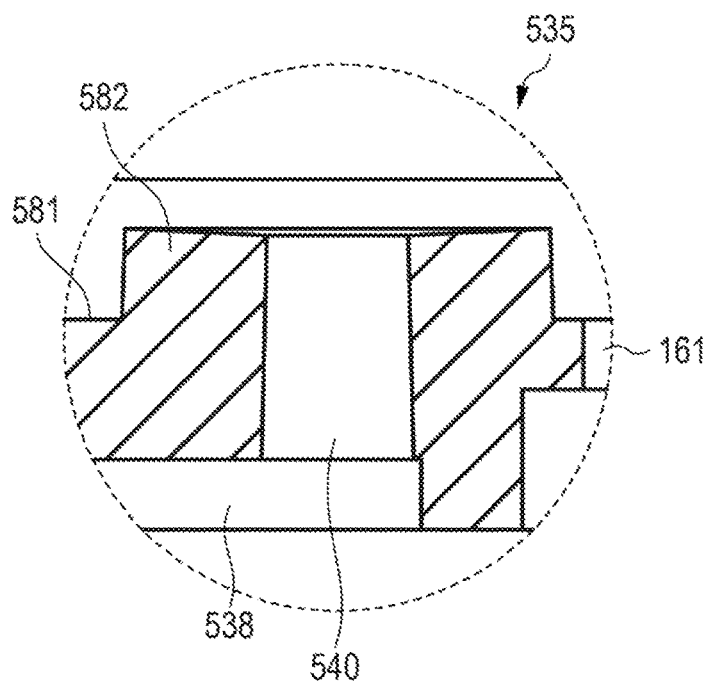

FIG. 11A is a perspective view of emitter 520 as viewed from front surface 139 side, and FIG. 11B is a perspective view of emitter 520 as viewed from rear surface 138 side. FIG. 12A is a plan view of emitter 520 according to Embodiment 4 prior to joining of emitter main body 522 and film 124, and FIG. 12B is a bottom view of emitter 520 according to Embodiment 4 prior to joining of emitter main body 522 and film 124. FIG. 13A is a side view of emitter 520, FIG. 13B is a sectional view taken along line A-A of FIG. 12A, and FIG. 13C is a sectional view taken along line B-B of FIG. 12A. FIG. 14A is a partially enlarged sectional view of channel opening/closing part 536, and FIG. 14B is a partially enlarged sectional view of flow rate reducing part 535.

As illustrated in FIG. 11A to FIG. 12B, emitter 520 includes emitter main body 522 and film 124. Emitter main body 522 and film 124 are integrally formed through hinge part 126.

Emitter 520 includes water intake part 131, first connecting groove 532 that serves as first connecting channel 541, pressure reducing groove 533 that serves as pressure reducing channel 542, bypass groove 534 that serves as bypass channel 544, flow rate reducing part 535, channel opening/closing part 536, discharging part 137, and second connecting groove 538 that serves as second connecting channel 539. Water intake part 131, flow rate reducing part 535 and channel opening/closing part 536 are disposed on front surface 139 side of emitter 520. In addition, first connecting groove 532, pressure reducing groove 533, bypass groove 534, discharging part 137 and second connecting groove 538 are disposed on rear surface 138 side of emitter 520.

When emitter 520 and the tube are joined to each other, first connecting groove 532, pressure reducing groove 533, bypass groove 534 and second connecting groove 538 serve as first connecting channel 541, pressure reducing channel 542, bypass channel 544 and second connecting channel 539, respectively. That is, first channel 543 composed of water intake part 131, first connecting channel 541, pressure reducing channel 542, flow rate reducing part 535 and discharging part 137, and configured to connect water intake part 131 and discharging part 137 is formed. In addition, second channel 545 composed of water intake part 131, first connecting channel 541, bypass channel 544, channel opening/closing part 536, second connecting channel 359, flow rate reducing part 535 and discharging part 137, and configured to connect water intake part 131 and discharging part 137 is formed. Each of first channel 543 and second channel 545 distributes the irrigation liquid from water intake part 131 to discharging part 137. In the present embodiment, the downstream side of channel opening/closing part 536 of second channel 545 is connected with flow rate reducing part 535, and first channel 543 and second channel 545 overlap each other in the region from flow rate reducing part 535 to discharging part 137.

Water intake part 131 includes water intake side screen part 151 and water intake through hole 152. In the present embodiment, water intake through hole 152 is one long hole formed along the longitudinal axial direction of the bottom surface of water intake recess 153. Since the long hole is covered with a plurality of first projected lines 156, water intake through hole 152 appears to be separated into multiple through holes as viewed from the front side.

First connecting groove 532 (first connecting channel 541) connects water intake through hole 152 (water intake part 131) with pressure reducing groove 533 and bypass groove 534. Bypass groove 534 is connected in the vicinity of the center portion of first connecting groove 532, and pressure reducing groove 533 is connected at one end (the side on which water intake through hole 152 is not disposed) of first connecting groove 532. In the present embodiment, a part of the region of bypass groove 534 is formed to function as a pressure reducing groove. In addition, a part of the region of connecting groove 432 between water intake through hole 152 and bypass groove 534 is also formed to function as a pressure reducing groove.

Flow rate reducing part 535 includes flow rate reducing recess 171, first valve seat part 572, communication groove 573, discharging through hole 174, first diaphragm part 175, and first connecting hole 576 communicating with channel opening/closing part 536. Flow rate reducing through hole 161, discharging through hole 174, and first connecting hole 576 communicating with second connecting groove 538 (second connecting channel 539) open at flow rate reducing recess 171.

First valve seat part 572 is disposed to surround discharging through hole 174 on the bottom surface of flow rate reducing recess 171. In the present embodiment, first valve seat part 572 has a shape of an annular protrusion. To be more specific, first valve seat part 572 is formed such that its valve seat surface is tilted from the opening of discharging through hole 174 toward the bottom surface of flow rate reducing recess 171. Communication groove 573 includes constant part 577 communicating with discharging through hole 174 and having a constant cross-sectional area, and reducing part 578 disposed on the external edge side relative to constant part 577. The cross-sectional area of reducing part 578 decreases toward the external edge.

Channel opening/closing part 536 includes channel opening/closing recess 581, second valve seat part 582, second diaphragm part 183, and second connecting hole 540 communicating with second connecting groove 538 (second connecting channel 539).

Channel opening/closing recess 581 has a nearly circular shape in plan view. Bypass through hole 163, second valve seat part 582, and second connecting hole 540 communicating with second connecting groove 538 (flow rate reducing part 535) are disposed on the bottom surface of channel opening/closing recess 581. In the present embodiment, channel opening/closing recess 581 and flow rate reducing recess 171 have the same size and the same shape. That is, in Embodiment 4, the size of channel opening/closing recess 581 is larger than that of the channel opening/closing recesses 181 and 381 of Embodiments 1 to 3. In the present embodiment, flow rate reducing recess 171 and channel opening/closing recess 581 are disposed side by side in the longitudinal axial direction of emitter 520. The irrigation liquid having entered channel opening/closing recess 581 flows into flow rate reducing part 535 through second connecting hole 540, second connecting channel 539 and first connecting hole 576.

In the trickle irrigation tube according to Embodiment 4, the irrigation liquid is discharged out of the tube through second channel 545 and first channel 543 when the pressure of the irrigation liquid is low. As the pressure of the irrigation liquid increases, first diaphragm part 175 deforms toward first valve seat part 572, and second diaphragm part 183 deforms toward second valve seat part 582. When the pressure of the irrigation liquid reaches the first pressure, second diaphragm part 183 makes contact with second valve seat part 582 to close second channel 545. At this time, since the size of channel opening/closing recess 581 is large in comparison with Embodiments 1 to 3, second diaphragm part 183 is easily influenced by the pressure of the irrigation liquid. Accordingly, the time period until the flow rate of the irrigation liquid in second channel 545 becomes zero from the maximum flow rate is reduced (see the broken line of FIG. 7). When second channel 545 is closed, the irrigation liquid is discharged through only first channel 543.

When the pressure of the irrigation liquid in the tube is further increased, first diaphragm part 175 is further deformed toward first valve seat part 572. Normally, as the pressure of the irrigation liquid increases, the amount of the irrigation liquid flowing through first channel 543 increases. In contrast, in emitter 520 according to the present embodiment, the valve seat surface of first valve seat part 572 is tilted downward toward the outer edge. As a result, as the pressure of the irrigation liquid increases over the second pressure, first diaphragm part 175 further closely makes contact with the valve seat surface, and the length of the channel formed by communication groove 573 and first diaphragm part 175 is gradually increased, and, the opening on the outer edge side thereof is gradually reduced. In this manner, when the pressure of the irrigation liquid becomes the second pressure or greater, the flow rate of the irrigation liquid from flow rate reducing part 535 is controlled at a flow rate corresponding to the channel opening area, and finally, only the irrigation liquid having the flow rate corresponding to the opening area is discharged from the discharging port. In this manner, in emitter 520 according to Embodiment 4, when the pressure of the irrigation liquid is equal to or greater than the second pressure, the increase of the flow rate of the irrigation liquid due to the pressure of the irrigation liquid, and reduction of the flow rate of the irrigation liquid due to the channel opening area are offset, and therefore, the amount of the irrigation liquid discharged from the discharging port is not increased even when the pressure of the irrigation liquid is increased to the second pressure or greater.

(Effect)

With the above-mentioned configuration, in comparison with the trickle irrigation tube according to Embodiment 1, the trickle irrigation tube according to Embodiment 4 can further quantitatively drop the irrigation liquid irrespective of the pressure of the irrigation liquid in the tube.

In addition, since flow rate reducing recess 171 and channel opening/closing recess 581 are disposed side by side in the longitudinal axial direction of emitter 520, emitter 520 according to Embodiment 4 can be further readily downsized.

While connecting channels 141 and 441, pressure reducing channel 142 and bypass channel 144 are formed when emitter 120, 320, 420 or 520 and tube 110 are joined to each other in Embodiments 1 to 4, connecting channels 141 and 441, pressure reducing channels 142, 442 and 542 and bypass channels 144 and 544 may be formed in advance as channels in the emitter.

In addition, while the contact timing of deforming film 124 is adjusted by changing the positions (heights) of first valve seat parts 172 and 572 and second valve seat parts 182 and 582 in Embodiments 1 to 4, the positions (heights) of first valve seat parts 172 and 572 and second valve seat parts 182 and 582 may not be changed. In this case, the contact timing of deforming film 124 may be adjusted by changing the thicknesses and materials (elasticity) of first diaphragm part 175 and second diaphragm part 183.

This application is entitled to and claims the benefit of Japanese Patent Application No. 2015-035450 filed on Feb. 25, 2015, and Japanese Patent Application No. 2015-112274 filed on Jun. 2, 2015 the disclosure each of which including the specification, drawings and abstract is incorporated herein by reference in its entirety.

INDUSTRIAL APPLICABILITY

According to the present invention, an emitter which can drop liquid with an appropriate rate by the pressure of the liquid to be dropped can be easily provided. Accordingly, popularization of the above-mentioned emitter in technical fields of trickle irrigations, endurance tests and the like where long-term dropping is required, and further development of the technical fields can be expected.

REFERENCE SIGNS LIST

100 Trickle irrigation tube
110 Tube
112 Discharging port
120, 320, 420, 520 Emitter
122, 322, 422, 522 Emitter main body
124 Film
126 Hinge part
131 Water intake part
132 Connecting groove
133, 533 Pressure reducing groove
134, 534 Bypass groove
135, 535 Flow rate reducing part
136, 536 Channel opening/closing part
137 Discharging part
138 Rear surface
139 Front surface
141, 441 Connecting channel
142, 542 Pressure reducing channel
143, 443, 543 First channel
144, 544 Bypass channel
145, 445, 545 Second channel
151 Water intake side screen part
152 Water intake through hole
153 Water intake recess
154 Slit
155 Projected line
156 First projected line
157 Second projected line
161 Flow rate reducing through hole 162 Protrusion
163 Bypass through hole
164 Channel screen part
165 Protrusion
171 Flow rate reducing recess
172, 572 First valve seat part
173, 573 Communication groove
174 Discharging through hole
175 First diaphragm part
181, 381, 581 Channel opening/closing recess
182, 582 Second valve seat part
183 Second diaphragm part
191 Discharging recess
192 Intrusion preventing part
193 Projected line part
233 Second pressure reducing groove
242 Second pressure reducing channel
384 Second discharging through hole
385 Channel opening/closing recess main body
386 Extension part
432a First connecting groove
432b Second connecting groove
433a Third pressure reducing groove
433b Fourth pressure reducing groove
441a First connecting channel
441b Second connecting channel
442a Third pressure reducing channel
442b Fourth pressure reducing channel
532 First connecting groove
538 Second connecting groove
539 Second connecting channel
540 Second connecting hole
541 First connecting channel
576 First connecting hole
577 Constant part
578 Reducing part

The invention claimed is:

1. An emitter configured to be joined to an inner wall surface of a tube for distributing irrigation liquid at a position corresponding to a discharging port that communicates between an interior and an exterior of the tube, the emitter being configured to quantitatively discharge the irrigation liquid in the tube out of the tube from the discharging port, the emitter comprising:
a water intake part for intake of the irrigation liquid;
a discharging part disposed to face the discharging port and configured to discharge the irrigation liquid, the discharging part including a discharging, recess;
a first channel configured to connect the water intake part and the discharging recess together, and distribute the irrigation liquid;
a second channel configured to connect the water intake part and the discharging recess together, and distribute the irrigation liquid;
a flow rate reducing part disposed in the first channel and configured to reduce a flow rate of the irrigation liquid in accordance with a pressure of the irrigation liquid in the tube;
a channel opening/closing part disposed in the second channel, and configured to open and close the second channel in accordance with the pressure of the irrigation liquid in the tube;
a pressure reducing channel disposed in the first channel on an upstream side relative to the flow rate reducing part, and configured to reduce a pressure of the irrigation liquid taken from the water intake part and guide the irrigation liquid to the flow rate reducing part; and
a bypass channel disposed in the second channel on an upstream side relative to the channel opening/closing part, and configured to guide the irrigation liquid taken from the water intake part to the channel opening/closing part while maintaining the pressure of the irrigation liquid taken from the water intake part at a pressure higher than a pressure of the irrigation liquid having passed through the pressure reducing channel, wherein:
in response to the pressure of the irrigation liquid flowing through the tube is smaller than a first pressure, the irrigation liquid taken from the water intake part is guided to the discharging recess through the pressure reducing channel and the bypass channel, and
in response to the pressure of the irrigation liquid flowing through the tube is equal to or greater than the first pressure, the second channel is closed with the channel opening/closing part, and the irrigation liquid taken from the water intake part is guided to the discharging recess through the pressure reducing channel.

2. The emitter according to claim 1, wherein:
a downstream side of the channel opening/closing part is connected with the flow rate reducing part; and
in response to the pressure of the irrigation liquid flowing through the tube is smaller than the first pressure, the irrigation liquid from the bypass channel is guided to the discharging recess through both of the channel opening/closing part and the flow rate reducing part.

3. The emitter according to claim 1, wherein:
the flow rate reducing part and the channel opening/closing part are independently disposed;
the irrigation liquid from the pressure reducing channel is guided to the discharging recess through the flow rate reducing part; and
the irrigation liquid from the bypass channel is guided to the discharging recess through the channel opening/closing part.

4. The emitter according to claim 1, wherein the flow rate reducing part includes:
a flow rate reducing recess;
a first diaphragm part disposed as a partition between an interior of the flow rate reducing recess and the interior of the tube, the first diaphragm part having flexibility;
a flow rate reducing through hole opening at the interior of the flow rate reducing recess, and communicating with one of the discharging recess and the pressure reducing channel;
a first valve seat part disposed to surround the flow rate reducing through hole and face the first diaphragm part without making contact with the first diaphragm part, wherein the first diaphragm part is allowed to make close contact with the first valve seat part when the pressure of the irrigation liquid flowing through the tube is equal to or greater than a second pressure that is greater than the first pressure;
a communication groove formed on a surface of the first valve seat part to which the first diaphragm part is allowed to make close contact, the communication groove being configured to communicate between the interior of the flow rate reducing recess and the flow rate reducing through hole; and
a discharging through hole opening at the interior of the flow rate reducing recess, and communicating with an other of the one of the discharging recess and the pressure reducing channel.

5. The emitter according to claim 4, wherein:
the emitter is formed of one material having flexibility; and
the first diaphragm part is integrally formed as a part of the emitter.

6. The emitter according to claim 1, wherein the channel opening/closing part includes:
- a channel opening/closing recess wherein a bypass through hole communicating with the bypass channel opens at an interior of the channel opening/closing recess;
- a second diaphragm part disposed as a partition between the interior of the channel opening/closing recess and the interior of the tube, the second diaphragm part having flexibility; and
- a second valve seat part disposed to surround the bypass through hole and face the second diaphragm part without making contact with the second diaphragm part, wherein the second diaphragm part is allowed to make close contact with the second valve seat part in response to the pressure of the irrigation liquid flowing through the tube is equal to or greater than the first pressure.

7. The emitter according to claim 6, wherein:
the emitter is formed of one material having flexibility; and
the second diaphragm part is integrally formed as a part of the emitter.

8. The emitter according to claim 1, wherein the water intake part includes a water intake side screen part including a slit opening to the interior of the tube.

9. The emitter according to claim 1, wherein the discharging part includes an intrusion preventing part for preventing intrusion of foreign matters from the discharging port.

10. A trickle irrigation tube comprising:
a tube including a discharging port for discharging irrigation liquid; and the emitter according to claim 1 joined to an inner wall surface of the tube at a position corresponding to the discharging port.

* * * * *